United States Patent [19]
Katayama et al.

[11] Patent Number: 5,982,951
[45] Date of Patent: Nov. 9, 1999

[54] APPARATUS AND METHOD FOR COMBINING A PLURALITY OF IMAGES

[75] Inventors: Tatsushi Katayama, Tokyo; Hideo Takiguchi, Kawasaki; Kotaro Yano, Yokohama; Kenji Hatori, Hatogaya, all of Japan

[73] Assignee: Canon Kabushiki Kaisha, Tokyo, Japan

[21] Appl. No.: 08/862,753

[22] Filed: May 23, 1997

[30] Foreign Application Priority Data

| May 28, 1996 | [JP] | Japan | 8-133642 |
| Sep. 10, 1996 | [JP] | Japan | 8-260200 |

[51] Int. Cl.$^6$ ............................................. G06K 9/36
[52] U.S. Cl. ................ 382/284; 382/276; 358/450; 358/540; 348/584
[58] Field of Search .................... 382/284, 283, 382/276, 274; 345/115–118, 435, 438, 113; 348/47, 584–601; 358/501, 540, 466, 456, 450

[56] References Cited

U.S. PATENT DOCUMENTS

| 5,140,647 | 8/1992 | Ise et al. ................ 382/284 |
| 5,185,808 | 2/1993 | Cok ........................ 382/284 |
| 5,287,418 | 2/1994 | Kishida ................... 358/466 |
| 5,581,377 | 12/1996 | Shimizu et al. ........ 358/540 |
| 5,646,679 | 7/1997 | Yano et al. ............. 348/47 |
| 5,680,150 | 10/1997 | Shimizu et al. ........ 345/438 |
| 5,721,624 | 2/1998 | Kumashiro et al. .... 358/450 |

FOREIGN PATENT DOCUMENTS

| 7-115534 | 5/1995 | Japan | H04N 1/387 |
| 2130838 | 6/1984 | United Kingdom | H04N 1/40 |

*Primary Examiner*—Leo H. Boudreau
*Assistant Examiner*—Ishrat Sherali
*Attorney, Agent, or Firm*—Morgan & Finnegan LLP

[57] ABSTRACT

An image combine apparatus for combining a plurality of images to generate a panoramic image. The image combine apparatus identifies an overlapping region of two inputted images and determines a boundary of the two images. The image combine apparatus then sets a tone correction area having a predetermined width such that the boundary of the two images is the center of the area, and performs tone correction within the area. The image combine apparatus performs linear tone correction in accordance with a distance between a pixel and the boundary. In the neighbor of the boundary of the two images within the tone correction area, density of the image gradually changes, thus a combined image whose boundary of the two images is inconspicuous is obtained.

18 Claims, 20 Drawing Sheets

| PIXEL VALUE Pb OF IMAGE b | PIXEL VALUE f(Pb) AFTER TONE CONVERSION |
|---|---|
| 0 | 5 |
| 1 | 7 |
| 2 | 12 |
| 252 | 245 |
| 253 | 246 |
| 254 | 247 |
| 255 | 248 |

910

FIRST MODIFIED EMBODIMENT

SECOND MODIFIED EMBODIMENT

| PIXEL VALUE OF IMAGE b | PIXEL VALUE AFTER TONE CONVERSION |
|---|---|
| 0 | 5 |
| 1 | 7 |
| 2 | 12 |
| 252 | 245 |
| 253 | 246 |
| 254 | 247 |
| 255 | 248 |

APPARATUS AND METHOD FOR COMBINING A PLURALITY OF IMAGES

BACKGROUND OF THE INVENTION

The present invention relates to an apparatus and a method for combining images, and more particularly, to an image combining apparatus and method thereof for combining a plurality of images partially including an overlapping region having the same image, to generate one panoramic image having a wide angle of view.

According to the conventional method of generating a panoramic image having a wide angle of view by combining a plurality of images partially having an overlapping region of the same image, two images are combined on a plane by geometrical transformation such as Affin transformation or the like to coincide coordinates values of two corresponding points, which are extracted from the overlapping regions having the same image but having different coordinates values.

However, in a case where conditions, particularly exposure conditions, of photographing the plurality of images are different for each image due to some factors of a photographing subject, even if the two images are combined precisely with the corresponding points being coincided according to the conventional method, the boundary of the images would have a conspicuous line due to the difference in lightness of the images.

The disadvantage of the conventional image combine technique is explained with reference to FIGS. 1, 2A, 2B and 3.

It is assumed herein that an image of a subject shown in FIG. 1 is picked up by an electronic still camera or the like, taking two frames (frame f1 and frame f2) of photographs. Since the subject picked up by the frame f1 has a dark atmosphere as a whole, the camera corrects an exposure amount at the time of image pick-up such that the dark portion would be lighter. As a result, an image shown in FIG. 2A is obtained. Since the subject picked up by the frame f2 has a light atmosphere as a whole, the camera corrects an exposure amount at the time of image pick-up such that the light portion would be darker. As a result, an image shown in FIG. 2B is obtained. Accordingly, even if the two inputted images (images in FIGS. 1A and 1B) are combined precisely, the combined image shown in FIG. 3 would have a conspicuous line due to the difference in lightness.

SUMMARY OF THE INVENTION

The present invention has been made in consideration of the above situation, and has as its object to provide an image combining apparatus and method capable of combining images in a manner such that the boundary of the images is inconspicuous even in a case where exposure conditions are different for each inputted image.

Another object of the present invention is to provide an image combining apparatus and method which can generate a combined image whose boundary of the images is inconspicuous, by discriminating and identifying an overlapping region having the same image in two inputted images, and correcting tones of either or both of the inputted images in accordance with difference in tone density between the two inputted images.

Still another object of the present invention is to provide an image combining apparatus and method which can generate a combined image whose boundary of the images is inconspicuous, by performing tone correction particularly in the neighbor of the boundary.

Still another object of the present invention is to provide an image combining apparatus and method which can generate a combined image whose boundary of the images is inconspicuous, by performing tone correction on pixels in the neighbor of the boundary in the overlapping region, in accordance with how far the pixel of interest is from the boundary.

Still another object of the present invention is to provide an image combining apparatus and method which can generate a combined image whose boundary of the images is inconspicuous, by removing erroneously recognized corresponding points from a set of corresponding points which have been detected to identify the overlapping region of the images, and by determining parameters of tone correction on the basis of the set of corresponding points from which the erroneous corresponding points are removed, thereby increasing precision of tone correction.

According to a preferred embodiment of the present invention, since a coefficient of weighting is set in accordance with how far the pixel of interest is from the boundary of the images, it is possible to obtain a combined image on which smooth tone conversion has been performed.

According to a preferred embodiment of the present invention, since the tone conversion is performed only within a predetermined area, the processing time can be reduced, moreover it is possible to obtain a combined image which is consistent with the image before conversion.

According to a preferred embodiment of the present invention, since an area to be subjected to tone conversion is determined in accordance with the image in the overlapping region of the inputted images, tone correction and combine processing appropriate for the image are performed, thus possible to obtain a high-quality combined image.

According to a preferred embodiment of the present invention, since an area to be subjected to tone conversion is determined in accordance with difference in average values of the images in the overlapping region of the inputted images, it is possible to obtain a combined image on which appropriate and smooth tone conversion have been performed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

Figure 4:
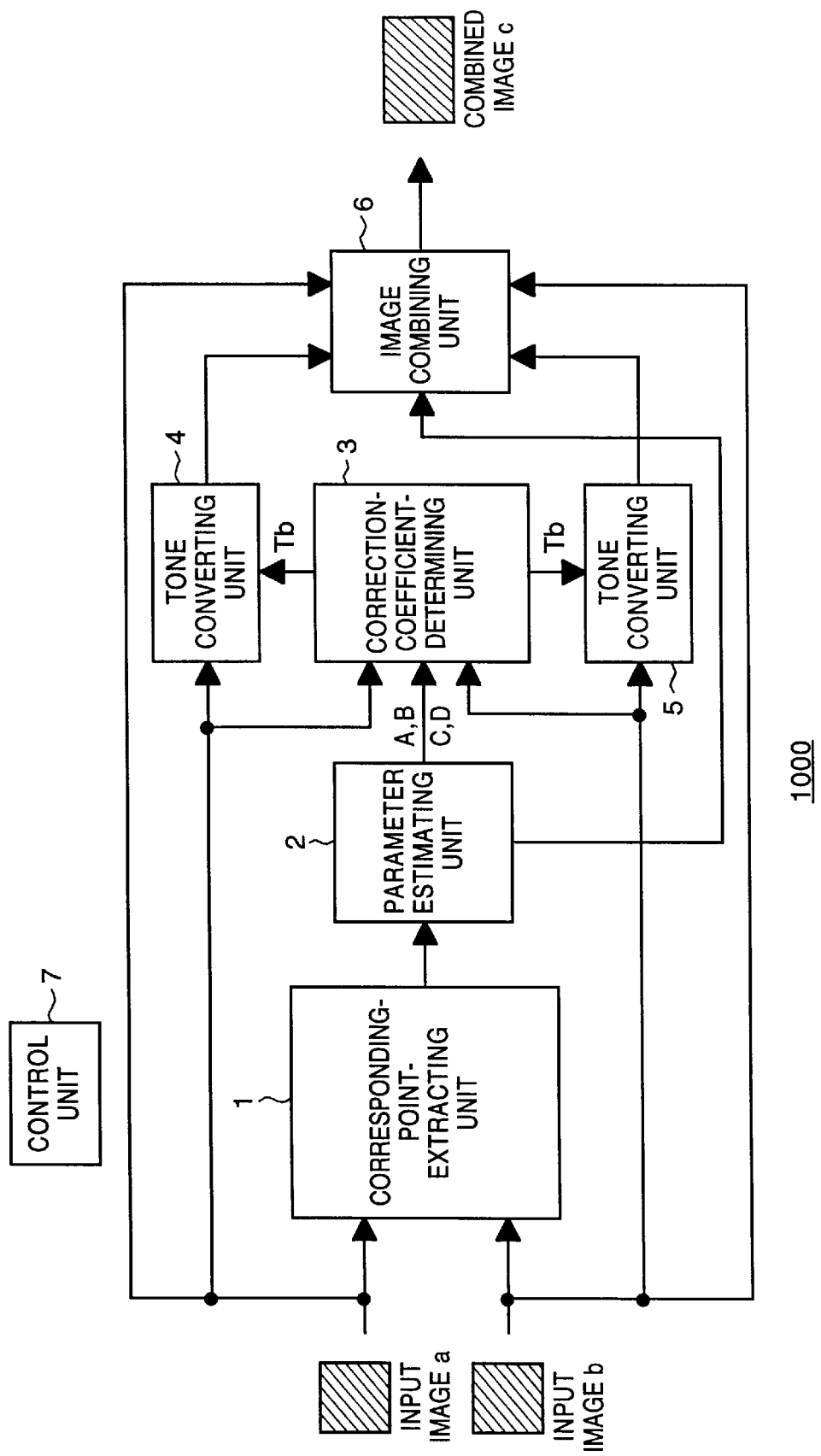
FIG. 4 is a block diagram showing an arrangement of an image combining apparatus according to the first embodiment of the present invention.

FIG. 4 shows the arrangement of an image combining apparatus 1000 according to the first embodiment of the present invention.

The combine apparatus 1000 may be a single apparatus, or may be built in a camera or the like. The apparatus serves to input two input images a and b, and to output a combined image c.

Figure 1:
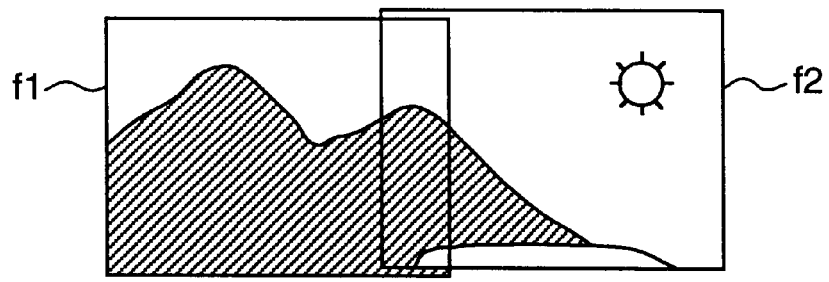
FIG. 1 is a view showing image pick-up conditions of inputted images according to the conventional example and the present embodiment.
Figure 2A:
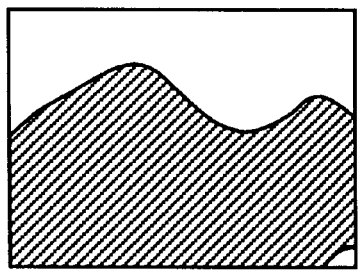
FIGS. 2A and 2B show examples of the input image.
Figure 2B:
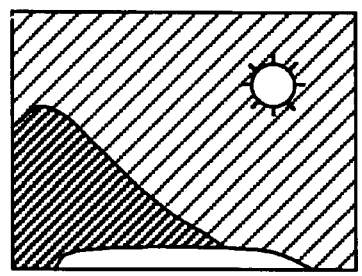
Figure 3:
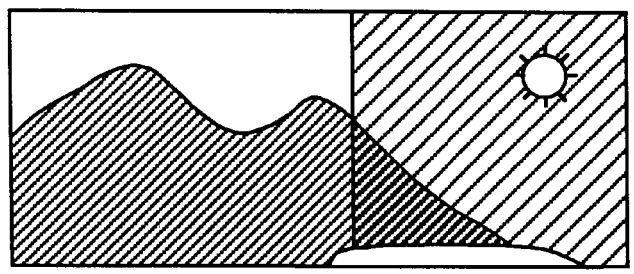
FIG. 3 shows an image combined in the conventional method.

Referring to FIG. 4, input images a and b are picked up by an electronic still camera or a video camera or the like in a manner such that both images partially include an overlapping region having the same image. Even if the input images a and b are picked up with different exposure conditions such as those shown in FIGS. 2A and 2B (e.g. one image picked up in a dark condition, and the other in a light condition), the combine apparatus 1000 outputs a combined image c whose boundary of the images is inconspicuous.

The combine apparatus 1000 includes a corresponding-point-extracting unit 1, parameter estimating unit 2, correction-coefficient-determining unit 3, two tone converting units 4 and 5, and image combining unit 6.

The corresponding-point-extracting unit 1 extracts corresponding points from the two input images a and b. Herein, corresponding points are each of the respective points in two images including an identical subject, which are picked up in separate image pick-up operation by the same light source. The corresponding points are outputted in the form of vectors. The corresponding-point-extracting unit 1 identifies an overlapping region of images a and b.

A parameter estimating unit 2 estimates parameters used for image conversion for the purpose of combining the two images, on the basis of the corresponding-points vectors extracted by the extracting unit 1.

A correction-coefficient-determining unit 3 determines coefficients used for tone correction performed on each of the input images a and b. The correction coefficients are determined on the basis of image data in the overlapping region of the input images a and b.

Tone converting units 4 and 5 respectively perform tone correction on the input images a and b such that lightness and tonality of every colors are equal in the overlapping region of the two images.

An image combining unit 6 converts the input images a and b, whose lightness has been corrected, utilizing the conversion parameters and combines the two images into a single image.

A control unit 7 controls the entire image combining apparatus.

Corresponding Point Extraction by Unit 1

Description will now be provided on the operation for generating a combined image c based on the input images a and b. Herein, description will be provided in a case where the input images a and b have N tones of density image data.

Figure 5:
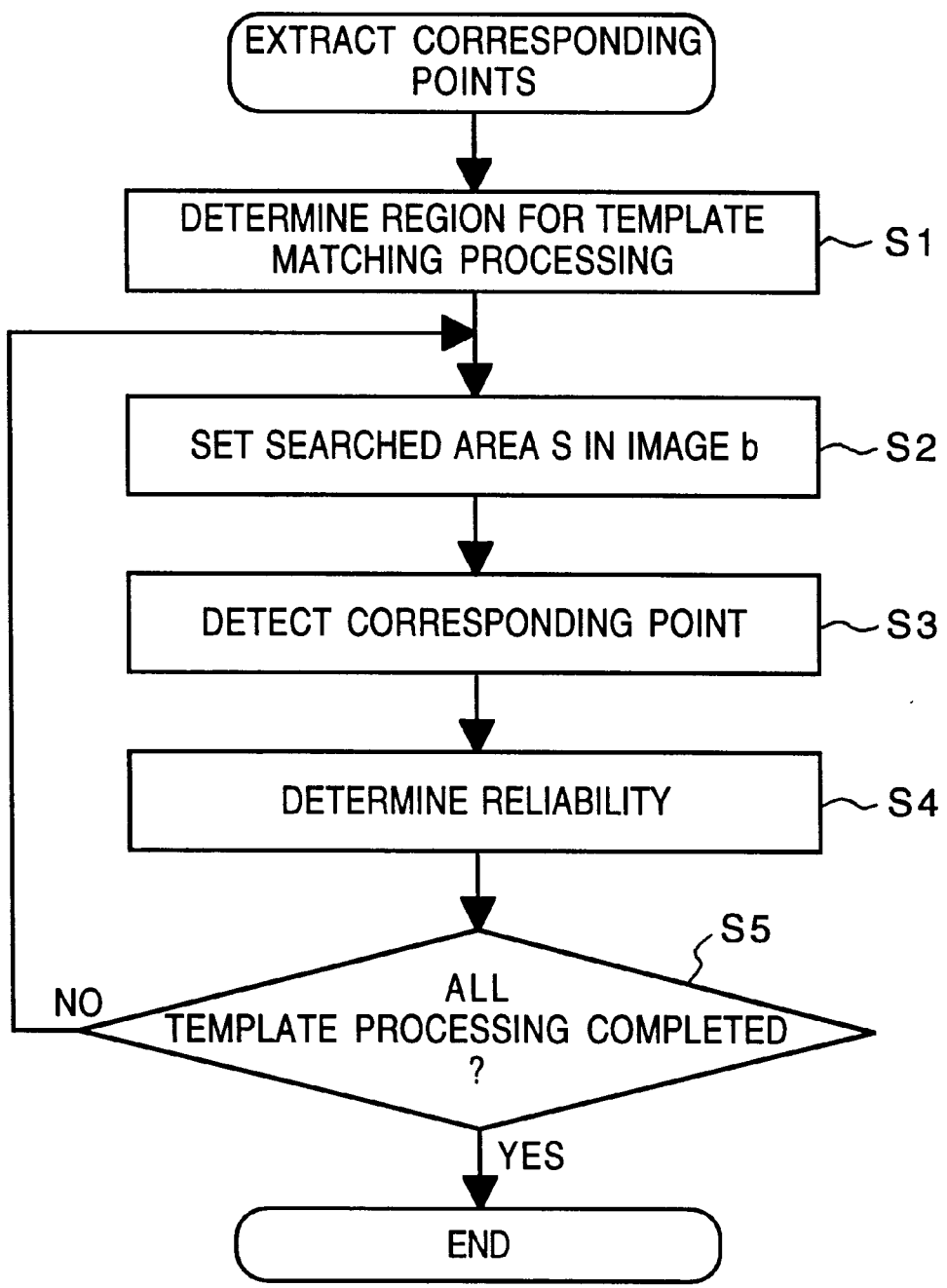
FIG. 5 is a flowchart showing a process algorithm performed by a corresponding-point-extracting unit according to the first embodiment.

The corresponding-point-extracting unit 1 extracts corresponding points from the input images a and b to identify an overlapping region. The process algorithm performed by the corresponding-point-extracting unit 1 is shown in FIG. 5. The algorithm shown in FIG. 5 is executed to perform template matching and extract corresponding points (i.e. overlapping region).

In step S1, the corresponding-point-extracting unit 1 determines a region which includes a template for performing template matching (hereinafter referred to as a template region). Since the frames of the input images a and b are arbitrarily set, the overlapping region cannot be determined in advance. Thus, the extracting unit 1 sets a predetermined region as a template region.

The predetermined region can be determined in various ways.

Figure 6A:
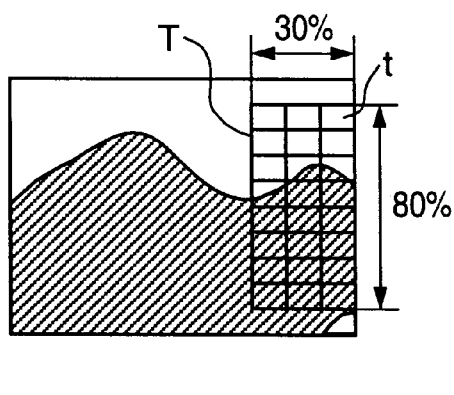
FIG. 6A is a view illustrating a method of extracting a template utilized to extract corresponding points from inputted images.

It is assumed in the first embodiment that the image of the frame fl is photographed first and the image of the frame f2 is photographed next. Therefore, the input image a is arranged in the left side and the input image b, in the right side. In other words, an overlapping region of the two images should be the right portion of the input image a and the left portion of the input image b. Accordingly, a predetermined region T is set as shown in FIG. 6A. The region T is located in the right portion of the image a. The horizontal length of the region T is 30% of the horizontal length of the image a, and a vertical length of the region T is 80% of the vertical length of the image a. Note that the region T is located in the center of the vertical length of the image a, with the right end thereof adjoining to the right end of the image a.

Figure 6B:
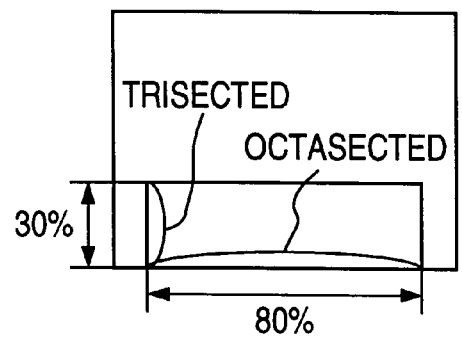
FIG. 6B is a view illustrating a method of extracting a template utilized to extract corresponding points in a case where inputted images are arranged one on top of the other.

Note that in a case where the input images a and b are arranged vertically, one on top of the other, the template region T is set as shown in FIG. 6B. More specifically, the region T is located at the lower portion of the image a. The vertical length of the region T is 30% of the vertical length of the image a, and the horizontal length of the region T is 80% of the horizontal length of the image a. Note that the region T is located in the center of the horizontal length of the image a, with the lower end adjoining to the lower end of the image a.

In the process of extracting corresponding points as shown in FIG. 5, matching process is repeated for a plurality of times with respect to the region T. A region (hereinafter referred to as a searching template) subjected to single matching processing is $1/24$ ($=1/3 \times 1/8$) of the region T. A single searching template is indicated by "t" in FIG. 6A.

Steps S2 to S4 which will be described below are performed with respect to the region T extracted in step Si.

Figure 7A:
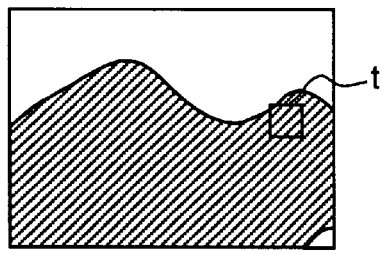
FIGS. 7A and 7B are views illustrating a method of setting a searching objective area for extracting corresponding points.
Figure 7B:
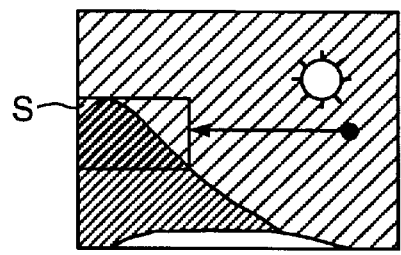

In step S2, the corresponding-point-extracting unit 1 determines a searching objective area S in the input image b, and within the area S, sets a searched area s which corresponds to the searching template t designated in the image a. The searching objective area S is set in the similar manner to the setting of the region T. That is, the searching objective area S as well as the searching template t are determined as shown in FIGS. 7A and 7B based on an assumption that, when a user takes photographs for generating a panoramic image, the user would set the frames fl and f2 such that no more than 50% of the input image a overlaps the input image b in the horizontal direction, and no more than ±10% of the image a deviates in the vertical direction with the image b. More specifically, the template t which is a searched area s is set to have a size of 10 % in the vertical direction and less than 50 % (preferably, 40 %) in the horizontal direction, of the image a.

Note that if an estimated overlapping condition of the input images a and b is different, the setting of the searching objective area for extracting corresponding points may be changed.

The area S shown in FIG. 7B is the searching objective area S set in correspondence with the template t shown in FIG. 7A. The extracting unit 1 identifies a corresponding point in step S3. More specifically, the extracting unit 1 parallelly moves the template t set in the image a within the searching objective area S set in the area b, i.e. the area s is moved within the area S. The extracting unit 1 then calculates a summation of absolute values of difference between all the image data included in the searching template t and all the image data included in the area s. The extracting unit 1 determines a position in the image b having the minimum summation $\Sigma D$ of the absolute values of the differences, as a corresponding point of the template t.

In step S4, the corresponding-point-extracting unit 1 determines reliability of the result of the corresponding points detected in step S3. The determination of reliability is made on the basis of the minimum value $\Sigma D^1_{min}$ and the second minimum value $\Sigma D^2_{min}$ of the summation $\Sigma D$ of the absolute values of the differences. That is, assuming that $Th_1$ and $Th_2$ are the respective predetermined threshold values, the detected corresponding point is determined to be reliable when the following equations are satisfied:

$$\Sigma D^1_{min} \leq Th_1 \qquad (1)$$

$$\Sigma D^2_{min} - \Sigma D^1_{min} \geq Th_2 \qquad (2)$$

Then the corresponding-point-extracting unit 1 stores coordinates of the corresponding points for the images a and b respectively in a memory (not shown).

Note that in order to detect positions of the corresponding points, besides from the above technique where the position having the minimum summation $\Sigma D$ of absolute values of the differences is determined as a corresponding point, the extracting unit 1 may calculate a correlation and determine a position having the largest correlation value as the corresponding point.

In addition, the corresponding position may be determined by a user. For instance, a user may designate an identical point in both images with a cursor or the like to be extracted, by referring to the two images a and b displayed on a display.

In the foregoing manner, the overlapping region of the images a and b are determined by repeatedly performing the control steps described in FIG. 5.

Determining Coordinates Conversion Parameter by Estimating Unit 2

The parameter estimating unit 2 estimates parameters for coordinates conversion on the basis of the extracted corresponding points from the overlapping region. Herein, coordinates conversion is the operation to coincide the overlapping region of the image a with the overlapping region of the image b. In the first embodiment, Affin transformation is employed.

Assuming that the image b is rotated for $\theta°$ with respect to the position of the image a, parallelly moved for a distance dx in the direction of X and a distance dy in the direction of Y, and is enlarged m times as the image a, an arbitrary point $(x_a, y_a)$ in the image a corresponds to the point $(x_b, y_b)$ in the image b defined by the following equation (3):

$$x_b = (\cos\theta \cdot x_a + \sin\theta \cdot y_a - dx) \times m = A \cdot x_a + B \cdot y_a + C$$

$$y_b = (-\sin\theta \cdot x_a + \cos\theta \cdot y_a - dy) \times m = -B \cdot x_a + A \cdot y_a + D$$

where $$A = m \cdot \cos\theta$$

$$B = m \cdot \sin\theta$$

$$C = -m \cdot dx$$

$$D = -m \cdot dy \qquad (3)$$

The parameter estimating unit 2 estimates the parameters A, B, C and D employing the least squares method. In order to estimate the parameters using the least squares method, at least two pairs of corresponding points are necessary.

Where only one pair of corresponding points is searched, the estimating unit 2 cannot perform matching processing since the rotation component θ cannot be determined. In such case, the estimating unit 2 assumes θ=0 and m=1, which implies that the image is not rotated. In other words, A and B are set to 1 and 0, respectively. Thus, assuming that the corresponding points vectors is denoted as ($a_x$, $a_y$), the unit 2 outputs the following parameters:

$$A=1(=\cos 0), B=0(=\sin 0) C=-a_x, D=-a_y \qquad (4)$$

In a case where no corresponding points is obtained, the subsequent processing will not be performed; instead, for instance, a message or the like is outputted to a CRT and the processing ends. The parameters obtained in the above manner are used when an overlapping region is estimated.

Tone Conversion

In order to generate a combined image whose boundary of the images is inconspicuous, the tone converting units 4 and 5 perform tone conversion on the inputted images a and b respectively so that the lightness and tonality of colors (R, G and B) are equal in the overlapping region of the two images. The correction-coefficient-determining unit 3 determines correction coefficients for the tone conversion processing.

Meanwhile, the tone conversion on lightness components is made in the embodiment. Where the embodiment adopts color images, tone correction on each color (R, G and B) may be performed. Specifically, a tone conversion using individual tone correction function is made on each of R, G and B images.

Figure 8:
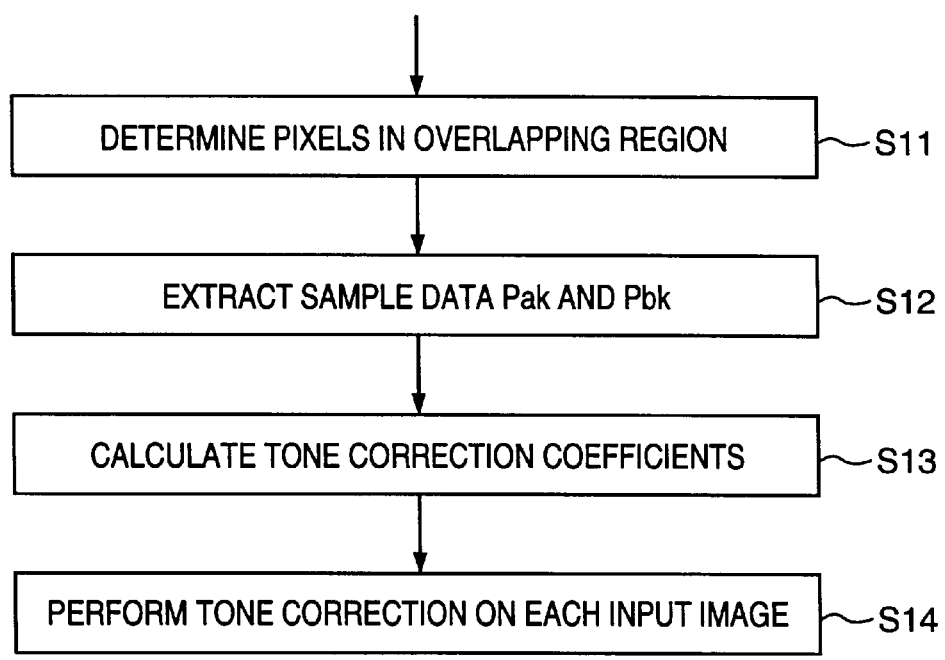
FIG. 8 is a flowchart showing a process algorithm of tone correction.

FIG. 8 shows the process algorithm performed by the correction-coefficient-determining unit 3 and the tone converting units 4 and 5. The correction-coefficient-determining unit 3 inputs parameters A, B, C and D estimated by the estimating unit 2 for coordinates conversion, and the images a and b. The tone converting units 4 and 5 respectively input the images a and b.

In step S11 of FIG. 8, the correction-coefficient-determining unit 3 determines whether or not each pixel of the input images a and b is within the overlapping region. For determination, coordinates values of each pixel in the input images are subjected to Affin transformation according to the equation (3), utilizing the parameters A, B, C and D. Then determination is made as to whether or not the coordinates values on which Affin transformation has been performed are within the area determined to be the overlapping region of the image b.

Next, in step S12 of FIG. 8, the correction-coefficient-determining unit 3 takes samples of image data for all or a predetermined number of pixels which are determined to be included in the overlapping region. Herein, it is assumed that N number of sample pixels are obtained. In other words, pixel values $P_a(k)$ and $P_b(k)$ (k=1 to N) are obtained. The following equation (5) can be obtained if Affin transformation in equation (3) is expressed simply by matrix H:

$$S(P_b(x', y'))=P_a(x, y) \qquad (5)$$

$P_a$(x, y) represents a pixels value at (x, y) coordinate position which is not subjected to the Affin transformation. $P_b$(x', y') represents a pixels value at (x, y) coordinate position which corresponds to the location (x', y') that has been subjected to the Affin transformation. S of the equation (5) represents a function which performs tone conversion processing in pixels which is accompanied with the above coordinate transformation. The tone conversion processing will be described in detail later.

Note that the correction-coefficient-determining unit 3 may perform the sampling of pixel values pixel by pixel, or for every arbitrary number of pixels. Moreover, the correction-coefficient-determining unit 3 may utilize, as sample data, an average value of the neighboring pixel values based on the coordinates of the corresponding points obtained by utilizing the parameters.

The correction-coefficient-determining unit 3 then obtains tone correction coefficients in step S13 of FIG. 8 on the basis of the sample data $P_a(k)$ and $P_b(k)$.

Figures 9, 10:
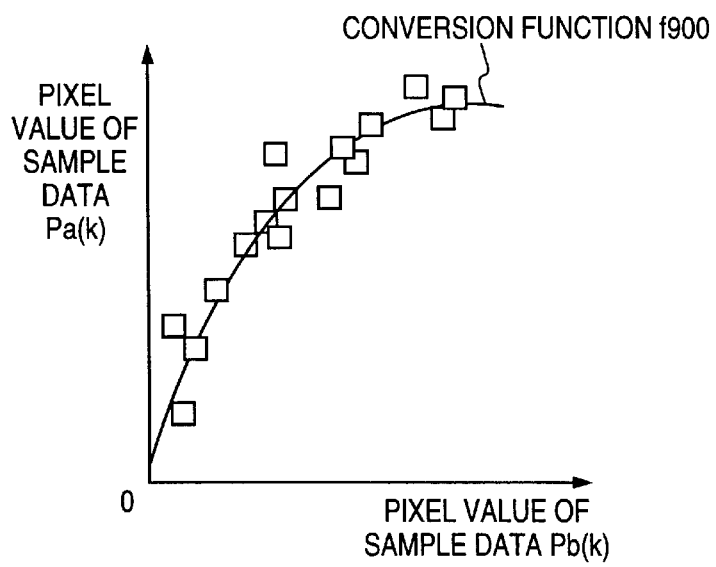
FIG. 9 is a graph showing characteristics of the relationship of sample data.
FIG. 10 shows a table which stores values of conversion functions for a tone converting unit.

FIG. 9 shows the brief method of calculating tone correction coefficients.

Referring to FIG. 9, the abscissa indicates a density value of the sample pixel data $P_b(k)$ of the image b; and the ordinate, a density value of the sample pixel data $P_a(k)$ of the image a. In step S13 of FIG. 8, the correction-coefficient-determining unit 3 generates a conversion function (function f900 in FIG. 9) on the basis of the above sample data, to coincide the pixel density value of one image (e.g. image a) to the pixel density value of the other image (e.g. image b).

Experimentally speaking, density values of the images a and b have a distribution similar to a quadratic function. Thus, to convert a pixel value in the overlapping region of the image b to a pixel value in the overlapping region of the image a, the following quadratic function will be employed.

$$f(P_b)=T_{b1}\times P_b^2+T_{b2}\times P_b+T_{b3} \qquad (6)$$

where $T_{b1}$, $T_{b2}$ and $T_{b3}$ are coefficients.

In step S13 of FIG. 8, the correction-coefficient-determining unit 3 obtains the coefficients $T_{b1}$, $T_{b2}$ and $T_{b3}$ to generate the f($P_b$) in equation (6). To obtain these values, the correction-coefficient-determining unit 3 calculates $T_{b1}$, $T_{b2}$ and $T_{b3}$ which minimizes an evaluation function ε expressed by the following equation:

$$\epsilon=\Sigma\{p_a(k)-(T_{b1}\times p^2_b(k)+T_{b2}\times p_b(k)+T_{b3})\} \qquad (7)$$

The correction-coefficient-determining unit 3 supplies the tone converting units 4 and 5 with the calculated coefficients $T_{b1}$, $T_{b2}$ and $T_{b3}$. Note that since the correction-coefficient-determining unit 3 calculates the coefficients to coincide the pixel values of the image b with the pixel values of the image a in the first embodiment, the tone correction coefficients $T_{a1}$, $T_{a2}$ and $T_{a3}$ for the image a are respectively, $T_{a1}$=0, $T_{a2}$=1 and $T_{a3}$=0.

Next, the tone converting units 4 and 5 convert pixel values of each of the images a and b in accordance with the tone correction coefficients $T_{b1}$, $T_{b2}$ and $T_{b3}$ in step S14 of FIG. 8. Hereinafter, the operation performed by the tone converting unit 5 will be described.

The tone converting unit 5 converts tones of the image b into tones of the image a. The tone converting unit 5 generates a table for converting the tones of the image b to the tones of the image a on the basis of the tone correction coefficients $T_{b1}$, $T_{b2}$ and $T_{b3}$. When the dynamic range of an image is 8 bits, pixel values 0 to 255 of the image b have the values f(0) to f(255) in the space of the image a, according to the quadratic function f($P_b$) in equation (6). Examples of f(0) to f(255) in a conversion table 910 are shown in FIG. 10.

Although the tone converting unit 4 is capable of converting density values of the image a into density values in the space of image b, pixel values of the image a do not need to be converted in the first embodiment; thus f($P_a$)=$P_a$. Therefore, the conversion table in the tone converting unit 4 converts the pixel values 0 to 255 into pixel values 0 to 255, in other words, no conversion is performed.

Note that in a case of a color image, it is preferable to perform tone conversion by generating a conversion function commonly utilized by R, G and B. Tone conversion functions for respective colors may be provided so that color matching may be improved.

Although the quadratic function is utilized as a conversion function in the first embodiment, it is possible to utilize another form of function. Needless to say, it is also possible to perform tone conversion by utilizing a non-linear table.

Combining Images

Image combining unit 6 generates a single combined image, on the basis of the input images and the images on which the tone correction has been respectively performed by the tone converting unit 4 and 5.

Figure 11:
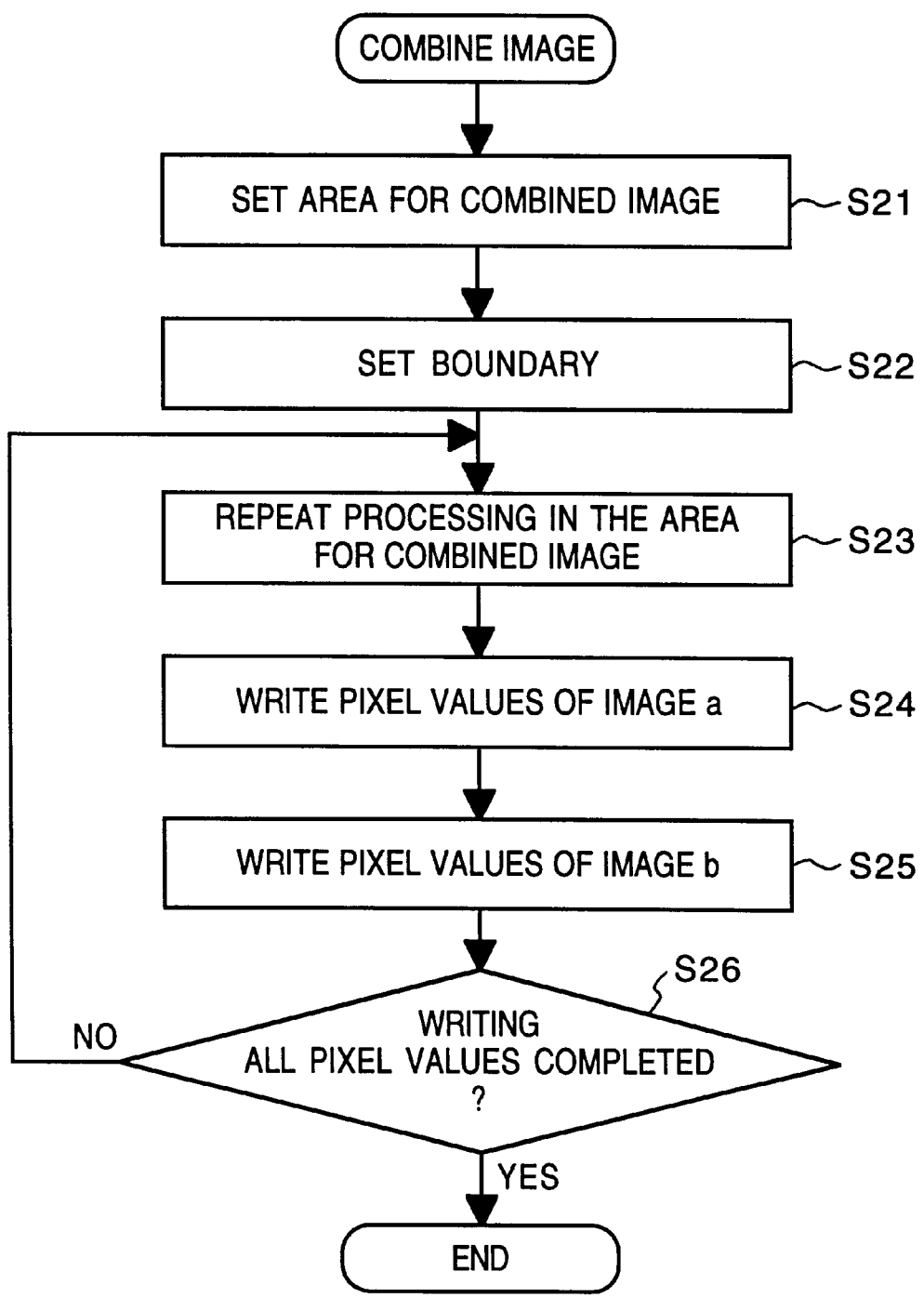
FIG. 11 is a flowchart showing a process algorithm performed by an image combining unit.

The image combining unit 6 generates a combined image c in accordance with an algorithm shown in FIG. 11.

In step S21, the image combining unit 6 sets an image area for the combined image c.

Figure 12:
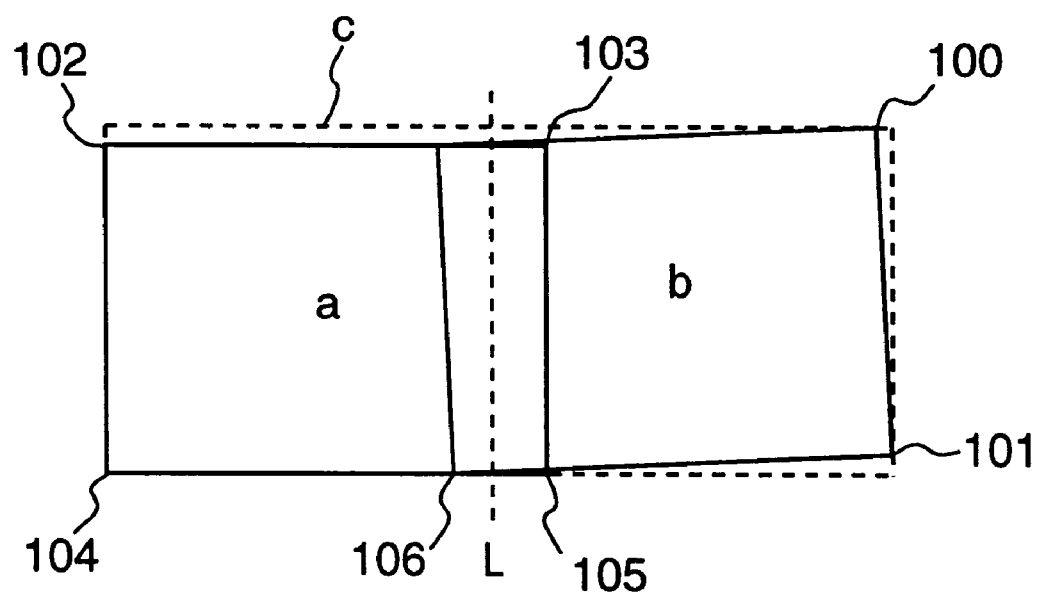
FIG. 12 is an explanatory view of the image combining method.

The area indicated by broken lines in FIG. 12 denotes the area for the combined image which has been set on the basis of a coordinates system of the input image a. Since the description of the first embodiment bases upon the coordinates of the input image a, for the purpose of a simple explanation, the upper side and the lower side of the image a are assumed to be parallel to coordinates axis X.

The image combining unit 6 first coincides the left end of the combined image c with the left end of the image a. The image combining unit 6 converts a position of the pixel (100) at the upper right end of the image b and a position of the pixel (101) at the lower right end of the image b respectively to positions in the coordinates system of the image a. Then, the image combining unit 6 coincides the right end of the combined image c with a position having a larger coordinates value between the converted two positions. In FIG. 12, since the lower right end 101 has a larger coordinates value, the image combining unit 6 coincides the right end of the combined image c with the lower right end 101.

Note that for the process of converting a coordinates value of image b into a coordinates value of image a to obtain a position having a larger coordinates, the image combining unit 6 employs the inverse transformation of Affin transformation shown in FIG. (8).

$$x_a = A' \cdot x_b + B' \cdot y_b + C'$$

$$y_a = -B' \cdot x_b + A' \cdot y_b + D'$$

where $$A' = A/(A^2 + B^2)$$

$$B' = -B/(A^2 + B^2)$$

$$C' = (-A \cdot C + B \cdot D)/(A^2 + B^2)$$

$$D' = (-B \cdot C - A \cdot D)/(A^2 + B^2) \quad (8)$$

Herein, A', B', C' and D' are parameters of the inverse transformation.

Similarly (see FIG. 12), the upper end of the combined image c is determined in the following manner. More specifically, the position of the pixel (100) at the upper right end of the image b and the position of the pixel (103) at the upper left end are converted respectively to positions in the coordinates system of the image a. The image combining unit 6 coincides the upper end of the combined image c with a position having the smallest coordinates value among the two converted positions, and the position of the pixel (102) at the upper left end of the image a. Furthermore, the image combining unit 6 coincides the lower end of the combined image c with a position having a larger coordinates value between the position of the pixel (101) at the lower right end and the position of the pixel (105) at the lower left end of the image b.

The combined image area c shown in FIG. 12 is determined in the above-described manner.

In step S22 in FIG. 11, the image combining unit 6 sets a boundary of the images so that the boundary is the center of the overlapping region. Since the images a and b are arranged side by side in the first embodiment, the boundary L which has been set in the center is indicated by broken lines L in FIG. 12. To explain more in detail, the boundary L is set parallel to vertical coordinates axis Y. In the horizontal direction, the boundary L is set so that the two images are combined at a barycenter between the coordinates of the pixel 106 located at the lower right end of the image a and a smaller coordinates value of the two pixels 103 or 105, respectively located at the upper left end and lower left end of the image b, which have been converted respectively to pixel positions in the coordinates system of image a.

In step S23, the image combining unit 6 repeatedly performs the processing in steps S24 and S25 on the area for the combined image c set in step S21.

The present invention has an object to generate a combined image whose density difference at the boundary of the images is inconspicuous. This object is partially attained by the tone correction in step S14 in FIG. 8. However, the tone conversion performed in step S14 is performed independently for each of the input images a and b, therefore does not always minimize the density difference near the boundary of the images in the overlapping region. The processing performed in steps S24 and S25 further smoothes the density difference near the boundary of the images in the overlapping region.

Figure 13:
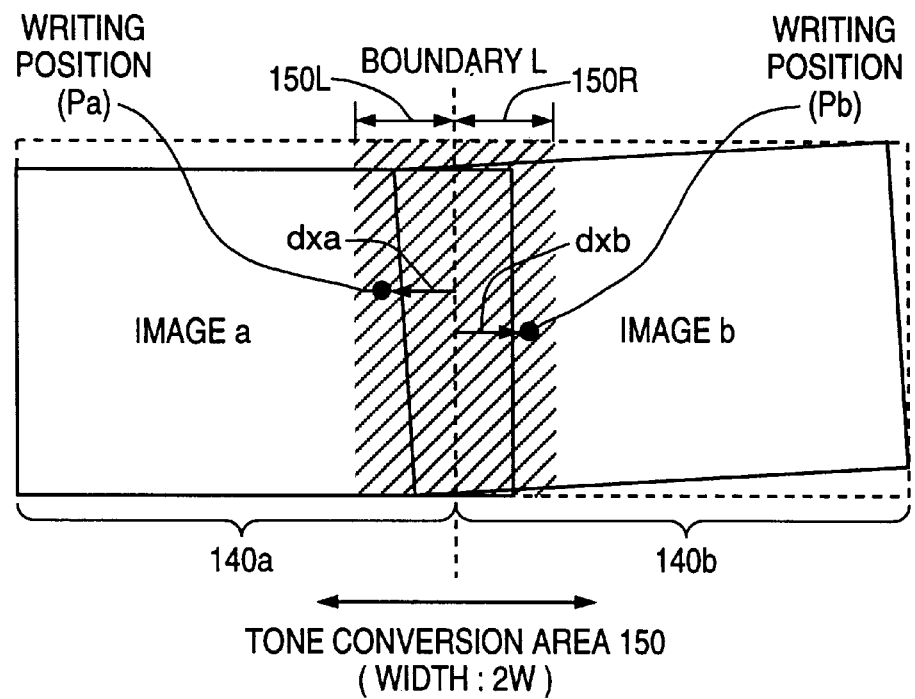
FIG. 13 is an explanatory view of the image combining method.

As shown in FIG. 13, a tone conversion area 150 having a predetermined width 2W is set in steps S24 and S25 of FIG. 11, with the boundary L of the images as its center. In other words, the tone conversion area 150 is a rectangular area having a width W respectively to the left and right of the boundary L.

In step S24, the image combining unit 6 writes pixel values of the pixels of the image a in the corresponding area of the combined image area c. With respect to those pixels included in an area 140a of the image a shown in FIG. 13 but not included in the tone conversion area 150, the image combining unit 6 writes the pixel values of the original image a. With respect to a pixel $P_a$ in the image a included in the tone conversion area 150, the image combining unit 6 determines a tone conversion value $P'_a$ in accordance with how far ($dx_a$) the pixel $P_a$ is from the boundary L. The tone conversion value $P'_a$ is determined by the following equation, utilizing a function f defined in the above-described conversion table (FIG. 10) stored in the tone converting unit 4.

$$P'_a = f(P_a) + P_a \cdot \frac{dx_a}{W} - f(P_a) \cdot \frac{dx_a}{W} \quad (9)$$

$$= P_a \cdot \frac{dx_a}{W} + f(P_a)\left(1.0 - \frac{dx_a}{W}\right)$$

According to equation (9), the tone conversion value $P'_a$ is obtained by adding a correction term $$P_a \cdot \frac{dx_a}{W} - f(P_a) \cdot \frac{dx_a}{W}$$

corresponding to a distance $dx_a$ is added to the value $f(P_a)$ which has been corrected in accordance with a function f in the conversion table.

As mentioned above, since the tone converting unit coincides the tone of the image b with that of the image a in the first embodiment, f=1. Accordingly, equation (9) is expressed by the following equation:

$$P'_a = P_a \quad (10)$$

In step S25, the image combining unit 6 similarly writes pixel values with respect to the area of image b. That is, with respect to those pixels included in an area 140b of the image b shown in FIG. 13 but not included in the tone conversion area 150, the image combining unit 6 writes the pixel value of the original image b. With respect to a pixel $P_b$ in the image b included in the tone conversion area 150, the image combining unit 6 determines a tone conversion value $P'_b$ in accordance with how far ($dx_b$) the pixel $P_b$ is from the boundary L. The tone conversion value $P'_b$ is determined by the following equation, utilizing a function f' defined in the conversion table stored in the tone converting unit 5.

$$P'_b = P_b \cdot \frac{dx_b}{W} + f(P_b)\left(1.0 - \frac{dx_b}{W}\right) \quad (11)$$

Figure 14:
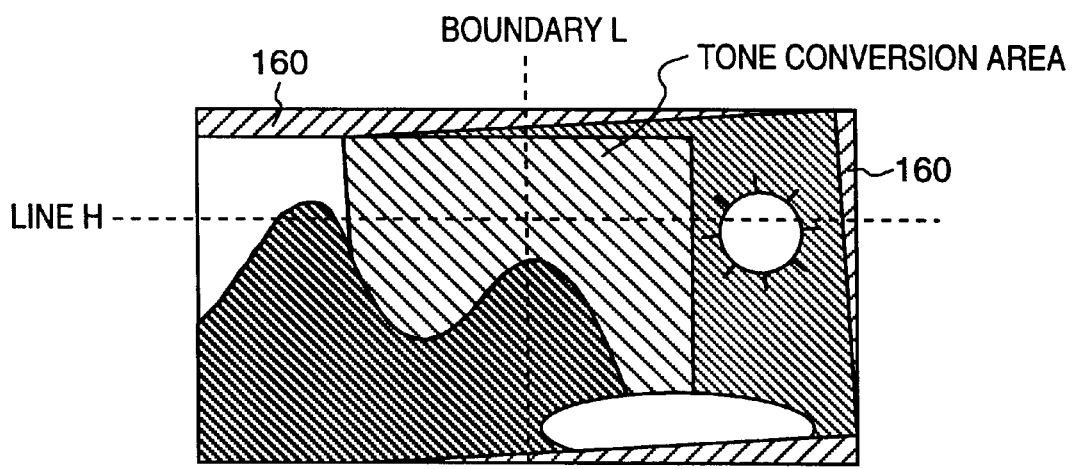
FIG. 14 shows a combined image.

FIG. 14 shows the combined image c obtained in the above-described manner.

A dummy area 160 indicated by hatching in FIG. 14 is a region where pixels of neither the image a nor image b are written. In the dummy area 160, a dummy pixel (e.g. white pixel or the like) is written.

Figure 15:
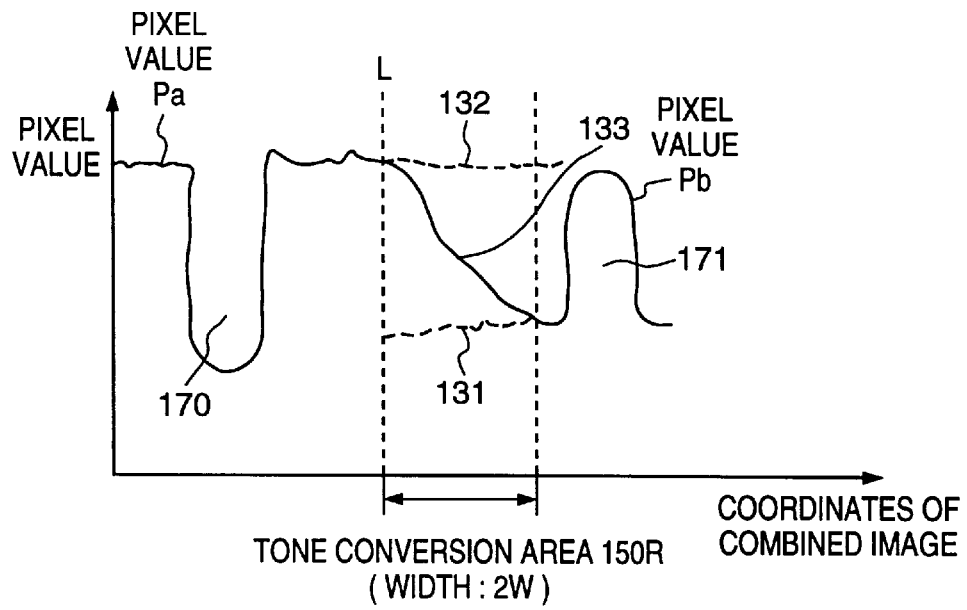
FIG. 15 is a graph showing variance in density in the combined image shown in FIG. 14.

FIG. 15 shows the variation of pixel values at an arbitrary line H in the combined image c shown in FIG. 14. In the graph in FIG. 15, the drop 170 of the pixel value $P_a$ represents a dark subject; and the rise 171 of the pixel value $P_b$, a light subject.

The variance in the graph in FIG. 15 will be described next. Since the pixel values of the image a are written in the combined image area c without being processed in the first embodiment, the pixel values located in the left side of the boundary L are the pixel values of the original image a. In other words, as expressed by equation (10), the pixel values located in the left side of the boundary L are not converted even though the pixels are within the tone conversion area 150.

Meanwhile, with respect to the pixel values located in the right side of the boundary L, tone conversion performed on each pixel would be different depending upon whether the pixel is within the tone conversion area 150R (width W). More specifically, with respect to a pixel value 133 included in the tone conversion area 150R, the pixel value is converted by the equation (11) such that the value gradually changes from the pixel value 131 of the original image b to the pixel value 132 converted in accordance with the correction table (function f') stored in the tone converting unit 5.

With respect to the area outside the tone conversion area 150R, pixel values of the original image b are written.

In the foregoing description, the image combining unit 6 performs writing of pixel values for the area of image a separately from the area of the image b, dividing the combined image area by the boundary L. However, a plurality of areas may be set in the overlapping region of each image (150L and 150R), and weights may be added to the pixel values of each image in each of the plurality of areas to generate pixel values of a combined image.

The combined image c generated by the foregoing processing is outputted to a printer or the like.

<Modification of First Embodiment>
. . . First Modified Embodiment

A modification of the first embodiment (first modified embodiment) will be described next.

An image combining apparatus according to the first modified embodiment has the same arrangement as that of the first embodiment shown in FIG. 4. However the functions and operation of the correction-coefficient-determining unit 3 and the image combining unit 6 are different from those of the first embodiment. The operation will be described hereinafter.

Figure 16:
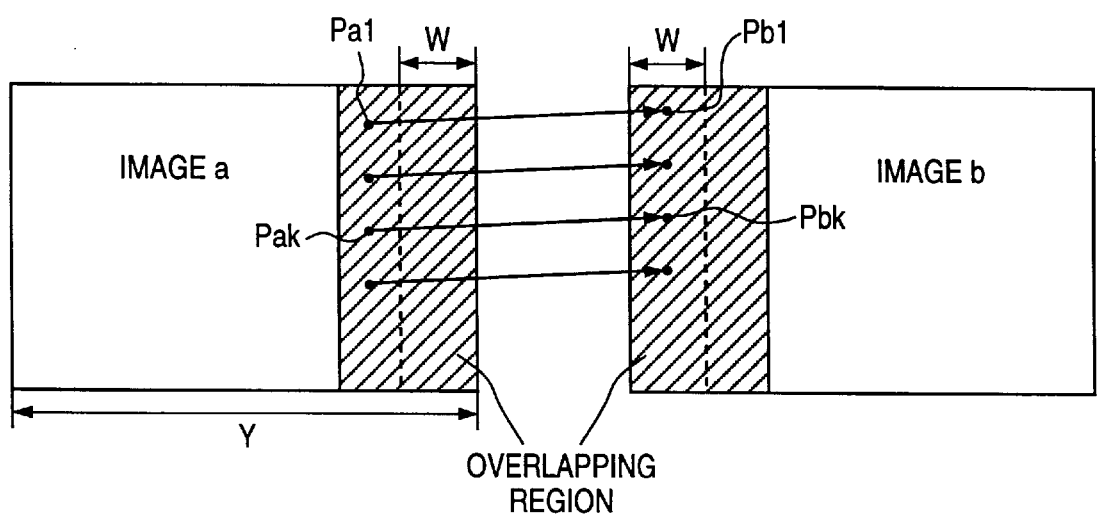
FIG. 16 is an explanatory view for explaining extraction of sample data according to a modified embodiment of the first embodiment.

The correction-coefficient-determining unit 3 according to the first modified embodiment determines pixel values included in the tone conversion area 150 on the basis of pixel values in the overlapping region of the input images a and b. The technique of determining thereof will be described with reference to FIG. 16.

As similar to the first embodiment, the correction-coefficient-determining unit 3 generates sample data $P_a(k)$ and $P_b(k)$ of corresponding points on the basis of the pixel values (see FIG. 16) included in the overlapping region of the image a and b. When generating the sample data, the correction-coefficient-determining unit 3 calculates an average value $dP_{avg}$ of difference dP in each pair of corresponding points, and supplies the average value $dP_{avg}$ to the image combining unit 6. Note that in FIG. 16, the reference letter Y denotes a lateral width of the image a. The image b has the same lateral width Y.

Assuming that the dynamic range of a pixel value is 8 bits, the image combining unit 6 sets the tone conversion area 2W on the basis of $P_{avg}$ by the following equation:

$$2W = Y \times \frac{dP_{avg}}{255} \quad (12)$$

$dP_{avg}$ in equation (12) denotes the difference in tones between each pair of corresponding points in the overlapping region of the images, having a maximum value 255 and a minimum value 0. According to equation (12), when the difference of the tone levels is large, the width 2W in the tone conversion area becomes large; and when the difference of the tone levels is small, the width 2W becomes small.

The foregoing description explains the technique of determining the tone conversion area according to the first modified embodiment, more specifically, the method of determining a width of the tone conversion area in correspondence with difference in tone levels, in a case where tones of the image a are different from tones of the image b in the overlapping region.

According to the first modified embodiment, a combined image is generated in the same manner as that of the first embodiment.

According to the first modified embodiment, since the tone conversion area can be suitably set in correspondence with the difference in tone levels in the overlapping region of the images, it is possible to perform smooth tone correction which is appropriate for an inputted image.

<Modification of First Embodiment>
. . . Second Modified Embodiment

The arrangement of an image combining apparatus according to the second modified embodiment is identical to that of the first embodiment (FIG. 4). Since the method of tone correction alone is different from that of the first embodiment, the method will be described below.

The image combining apparatus according to the second modified embodiment extracts sample data on the basis of pixel values in the overlapping region of input images a and b. This operation is identical to that of the first embodiment. The correlation between a pair of pixel values $P_a$ and $P_b$ which are extracted as sample data is determined in accordance with the method shown in FIG. 9.

In the first embodiment, the conversion function f900 (FIG. 9) is generated to coincide tones of the image b with tones of the image a on the basis of the relationship of each sample data by utilizing the least squares method. Accordingly, in the first embodiment, conversion of pixel values performed for tone correction is executed only on the image b. In the second modified embodiment, tone correction is executed on pixel values $P_a$ and $P_b$ of each image.

To describe more in detail, the correction-coefficient-determining unit 3 according to the second modified embodiment generates a conversion function f as similar to the technique described in the first embodiment with reference to FIG. 9, and provides the tone converting units 4 and 5 with tone correction coefficients ($T_{b1}$, $T_{b2}$ and $T_{b3}$) which prescribe the function f. Note that the conversion function f serves to coincide pixel values of image b with pixel values of image a, as similar to the first embodiment.

The tone converting unit 5 for converting the input image b performs tone conversion utilizing the conversion function f on the basis of the pixel values of image b. The tone conversion is executed by the following equation (13), where $P_b$ denotes a pixel value of the original image b, and $f(P_b)$ denotes a pixel value converted by the conversion function.

$$P'_b = \frac{P_b + f(P_b)}{2} \quad (13)$$

In other words, the image combining apparatus according to the second modified embodiment performs tone conversion on the input image b, by utilizing an average value of the original pixel value $P_b$ and the pixel value $f(P_b)$ obtained by the conversion function f.

Meanwhile, the tone converting unit 4 performs tone conversion in accordance with the following equation (14):

$$P'_a = P_a - \frac{f(P_b) - P_b}{2} \quad (14)$$

where $P_a$ is a pixel value of the original image a.

Figure 17:
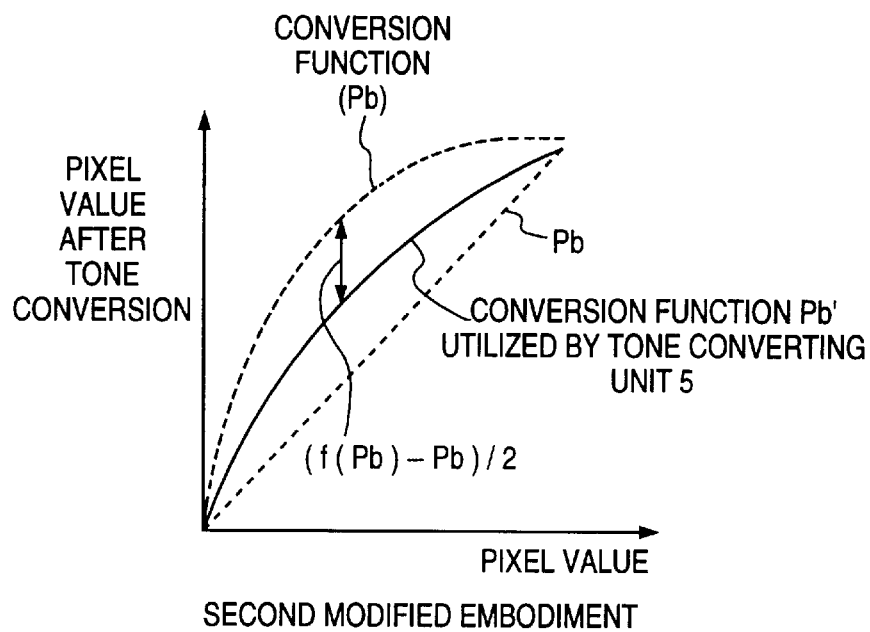
FIG. 17 is a graph showing characteristics of tone conversion according to a second modified embodiment of the first embodiment.

FIG. 17 shows the brief process of tone conversion performed on the image b in accordance with equation (14). As shown in FIG. 17, $\{f(P_b)-P_b\}$ denotes an offset amount between the conversion function $f(P_b)$ and the original pixel value $P_b$. Equation (14) expresses that tone conversion is performed by adding/subtracting half the value of $\{f(P_b)-P_b\}$ to/from the images a and b. By virtue of this calculation, pixel values of each image gradually change, thus smooth tone correction is realized.

The pixel values converted by each of the tone converting units 4 and 5 are maintained in a form of a table as shown in FIG. 10, as similar to the first embodiment.

In the second modified embodiment, the image combining unit 6 performs writing of pixel values in the combined image c, as similar to that described in the first embodiment.

Figure 18:
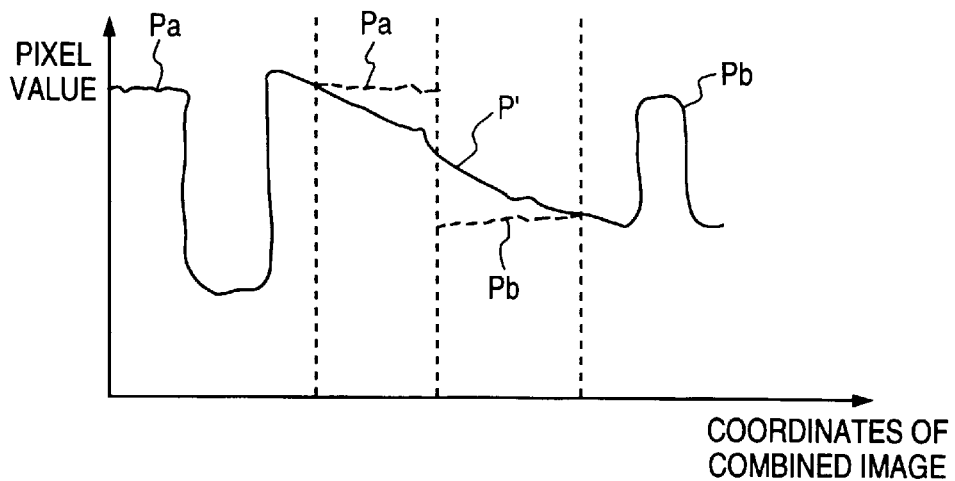
FIG. 18 is a graph showing characteristics of image combining process according to the second modified embodiment.

FIG. 18 shows variation of pixel values on the line H in FIG. 14 with respect to the image combined by the second modified embodiment. It is apparent from the graph that pixel values of each image are gradually changed, therefore smooth tone correction is realized.

<Second Embodiment>

Figure 19:
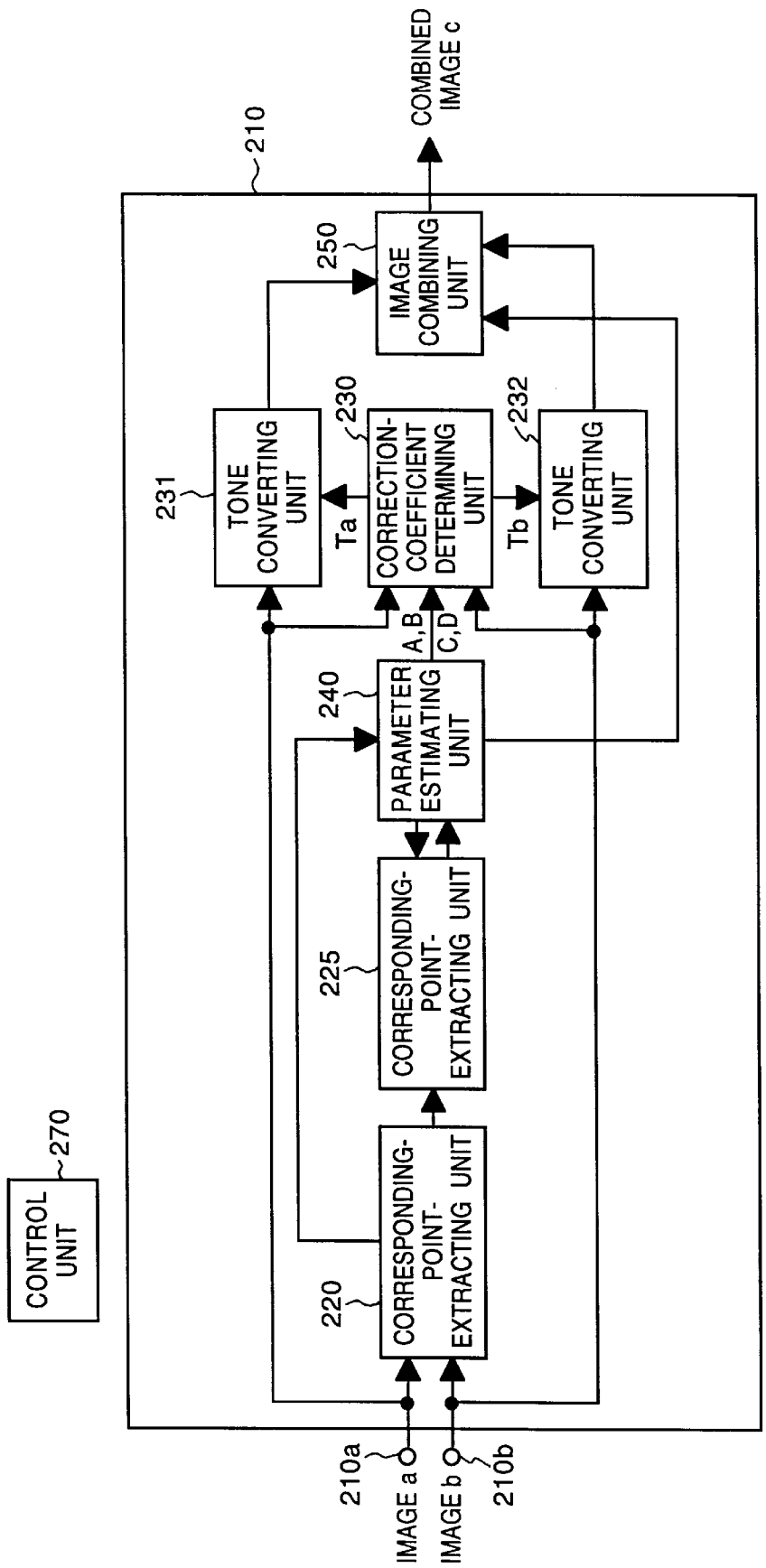
FIG. 19 is a block diagram showing the arrangement of the image combining apparatus and the process flow of an inputted image according to the second embodiment.

FIG. 19 is a block diagram showing the arrangement of an image combining apparatus 210 and the process flow of an inputted image according to the second embodiment.

Referring to FIG. 19, the image combining apparatus 210 mainly includes: input terminals 210a and 210b; a corresponding-point-extracting unit 220 which extracts corresponding points from two input images; a corresponding-point-selecting unit 225 which removes components which are erroneously detected as corresponding points from a set of corresponding points extracted by the corresponding-point-extracting unit 220, and which selects only the correct corresponding points; a parameter estimating unit 240 which estimates parameters for combining images; a correction-coefficient-determining unit 230 which determines coefficients for tone correction of the image; tone converting units 231 and 232 which respectively correct tones of input images a and b; and an image combining unit 250 which combines two images on which tone conversion has been performed.

Images a and b are respectively input to the input terminals 210a and 210b. The input images a and b are picked up by an electronic still camera or a video camera or the like in a manner such that both images partially include an overlapping region having the same image. As similar to the first embodiment, the exposure conditions at the time of image pick-up are different for the two images.

Each of the input terminals 210a and 210b is connected to the corresponding-point-extracting unit 220, correction-coefficient-determining unit 230, and tone converting units 231 and 232. The input images a and b are sent to the corresponding-point-extracting unit 220 where corresponding points are extracted from each of the images a and b.

The corresponding-point-extracting unit 220 is connected to the corresponding-point-selecting unit 225 and the parameter estimating unit 240. The corresponding points extracted by the corresponding-point-extracting unit 220 are sent to the corresponding-point-selecting unit 225 and the parameter estimating unit 240. The corresponding-point-selecting unit 225 and the parameter estimating unit 240 are interactively connected to each other. On the basis of coordinates conversion parameters estimated by the parameter estimating unit 240 and a coordinates value indicative of the corresponding points extracted by the corresponding-point-extracting unit 220, the corresponding-point-selecting unit 225 removes components which are erroneously detected as corresponding points from the corresponding points extracted by the corresponding-point-extracting unit 220, and sends the result to the parameter estimating unit 240. The parameter estimating unit 240 estimates parameters for image conversion on the basis of the result where erroneous corresponding points have been removed.

The parameter estimating unit 240 is connected to the correction-coefficient-determining unit 230 and image combining unit 250. The image conversion parameters estimated by the parameter estimating unit 240 is sent to the correction-coefficient-determining unit 230 and the image combining unit 250.

The correction-coefficient-determining unit 230, which holds images a and b inputted by the input terminals 210a and 210b and image conversion parameters (A, B, C and D) estimated by the parameter estimating unit 240, determines coefficients ($T_a$ and $T_b$) for tone correction of an image on the basis of the image included in the overlapping region of the images a and b. The correction-coefficient-determining unit 230 is connected to the tone converting units 231 and 232. The correction-coefficient-determining unit 230 sends the determined coefficients ($T_a$ and $T_b$) to the tone converting units 231 and 232, respectively. The tone converting units 231 and 232 perform tone conversion on each of the images a and b utilizing the coefficient ($T_b$) sent by the correction-coefficient-determining unit 230, so that lightness is equal in the overlapping region of the images a and b.

Each of the tone converting units 231 and 232 is connected to the image combining unit 250. The image combining unit 250 converts the images a and b, on which tone correction has been performed respectively by the tone converting units 231 and 232, by utilizing the parameters estimated by the parameter estimating unit 240 and combines the two images into a single image.

In the foregoing arrangement, the control unit 270 controls the entire image combining apparatus.

As will be described later, the second embodiment largely differs from the first embodiment by including the corresponding-point-selecting unit 225.

Hereinafter, the operation of the image combining apparatus 210 will be described in a case where a combined image c is generated based on the images a and b. Note that in the second embodiment, the input images a and b each includes density image data having N number of tones.

Extracting Corresponding Points

The input two images a and b are first sent to the corresponding-point-extracting unit 220 where corresponding points are extracted.

The processing for extracting corresponding points performed by the corresponding-point-extracting unit 220 is substantially identical to the processing performed by the extracting unit 1 in the first embodiment. In other words, the extracting unit 220 in the second embodiment executes substantially the same processing steps as the extraction processing steps (FIG. 5) in the first embodiment. That is, the extracting unit 220 extracts a set of corresponding points by performing template matching.

Estimating Coordinates Conversion Parameters

The corresponding-point-extracting unit 220 sends the extracted corresponding points to the parameter estimating unit 240 and the corresponding-point-selecting unit 225.

The parameter estimating unit 240 estimates parameters (A, B, C and D) for coordinates conversion, on the basis of the extracted corresponding points.

The second embodiment also requires coordinates conversion to coincide the overlapping region of the image a with the overlapping region of the image b. Thus, Affin transformation is employed as similar to the first embodiment. Accordingly, the parameter estimating unit 240 according to the second embodiment determines parameters A, B, C and D to be applied to the Affin transformation expressed by equation (3), and outputs the result to the correction-coefficient-determining unit 230. In other words, the estimating unit 240 according to the second embodiment is substantially identical to the estimating unit 3 according to the first embodiment.

Selecting Corresponding Points

A set of corresponding points extracted by the corresponding-point-extracting unit 220 and coordinates conversion parameters (A, B, C and D) estimated by the parameter estimating unit 240 are input to the corresponding-point-selecting unit 225. The corresponding-point-selecting unit 225 removes erroneously detected corresponding points from the set of corresponding points extracted by the corresponding-point-extracting unit 220. By virtue of this process, corresponding points, which will be utilized by the parameter estimating unit 240 for estimating image conversion parameters, are narrowed down to more appropriate values. The template matching, performed by the extracting unit 220 to extract corresponding points, has a possibility of erroneous recognition. Therefore, the corresponding points must be reconfirmed by a method different from template matching.

Figure 20:
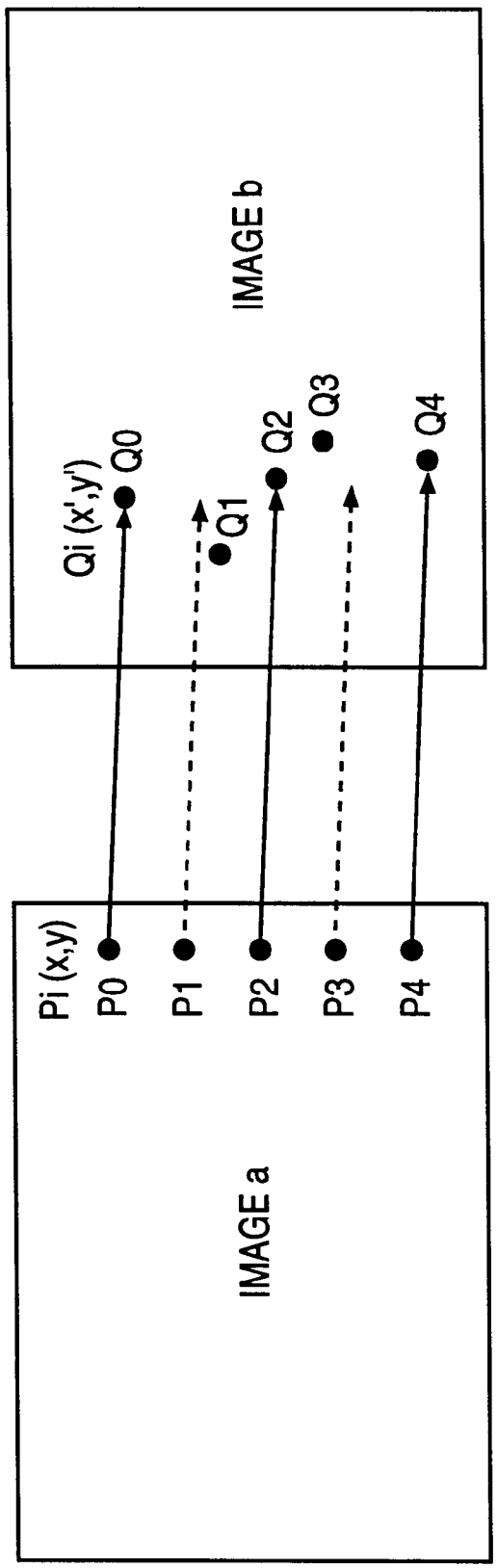
FIG. 20 is an explanatory view showing a point Pi in an image a and a corresponding point Qi in an image b, according to the second embodiment.

FIG. 20 illustrates processing performed by the selecting unit 225 where determination is made as to whether or not the corresponding points are erroneously recognized. In FIG. 20, it is assumed that a set of plural pairs of points $P_i$(x, y) and $Q_i$(x', y') (i=0, 1, . . . ) is a set of corresponding points of images a and b. The corresponding-point-selecting unit 225 utilizes the Affin transformation parameters A, B, C and D obtained by the parameter estimating unit 240 to detect components of erroneous corresponding points in accordance with the following equation:

$$|x'-(A \cdot x+B \cdot y+C)|<Th$$
$$|y'-(-B \cdot x+A \cdot y+D)|<Th \qquad (15)$$

In equation (15), (A·x+B·y+C) and (−B·x+A·y+D) respectively indicate coordinates (x, y) of an arbitrary point (estimated to be one of corresponding points) on the image a on which Affin transformation has been performed. Accordingly, if an absolute value of the difference between the coordinates (A·x+B·y+C, −B·x+A·y+D), on which Affin transformation has been performed on (x, y), and coordinates (x', y') on the image b, is larger than a threshold value Th, (i.e. if equation (15) is not satisfied), the pair of corresponding points $P_i$(x, y) and $Q_i$(x', y') is considered to be erroneously recognized.

The corresponding-point-selecting unit 225 selects only the corresponding points that satisfy equation (15) from the set of corresponding points obtained by the corresponding-point-extracting unit 220.

Referring to FIG. 20, arrows indicated by solid lines and broken lines represent movement of positions of the points according to Affin transformation. For instance, a pair of corresponding points indicated by the solid line, e.g. a pair of points $P_0$ and $Q_0$ or a pair of points $P_2$ and $Q_2$ is selected as the pair of corresponding points because the position obtained after Affin transformation and a position assumed to be the corresponding point are substantially equal. On the other hand, a pair of corresponding points $P_1$ and $Q_1$ or a pair of points $P_3$ and $Q_3$ obtained by the corresponding-point-extracting unit 220 is deviated for more than a threshold value, from the coordinates obtained on the basis of aforementioned parameters. These corresponding points are removed as erroneously recognized components.

Referring back to FIG. 19, the corresponding-point-selecting unit 225 sends the result of selection to the parameter estimating unit 240. The parameter estimating unit 240 estimates parameters used for combining images by utilizing the selected corresponding points. As set forth above, parameters for combining images are estimated on the basis of coordinates of corresponding points from which erroneous components have been removed. Therefore, the image combining apparatus can generate a more precise combined image.

Tone Correction Processing

The parameter estimating unit 240 sends the estimated parameters (A, B, C and D) to the correction-coefficient-determining unit 230. The correction-coefficient-determining unit 230 determines correction coefficients to be utilized by the tone converting units 231 and 232 for tone correction.

Figure 21:
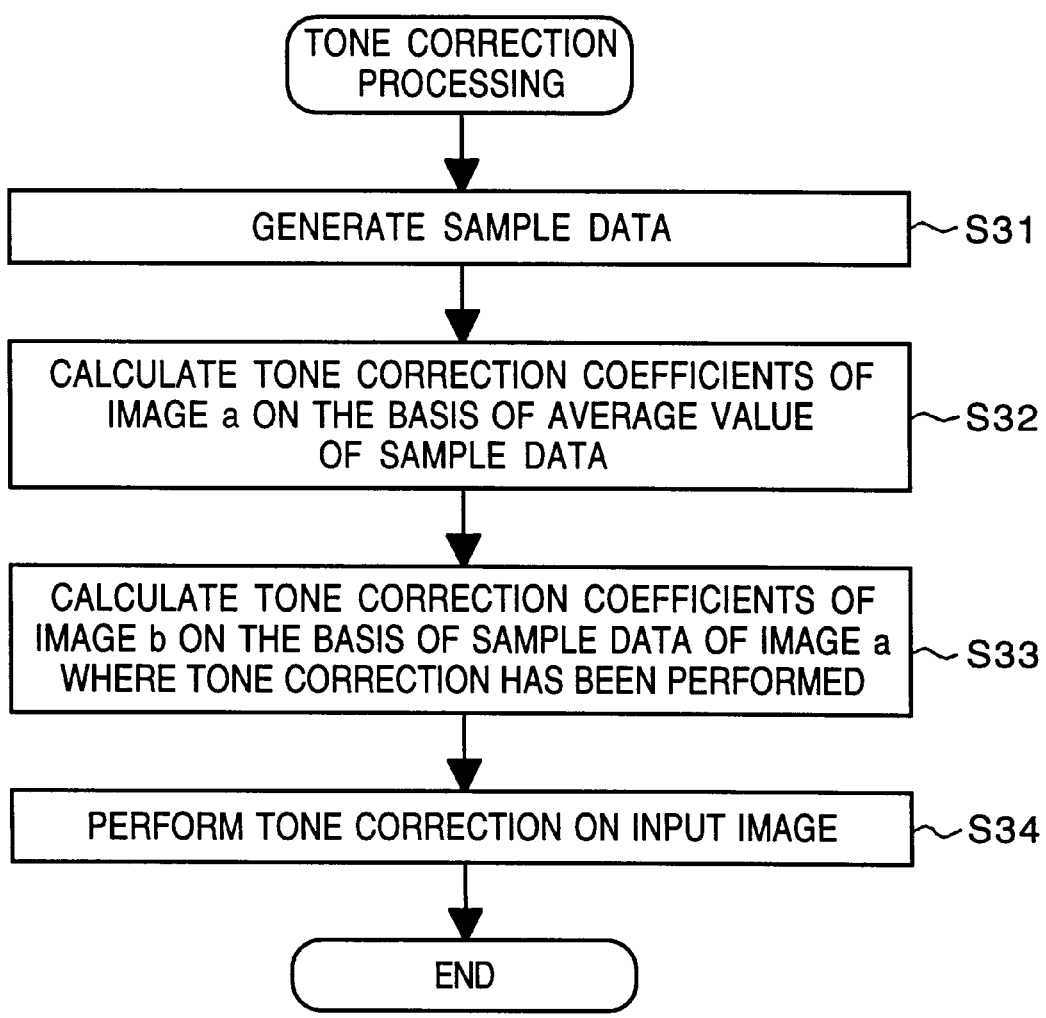
FIG. 21 is a flowchart showing the steps of tone correction processing performed by a correction-coefficient-determining unit and tone converting units according to the second embodiment.

FIG. 21 is a flowchart showing the tone correction processing performed by the correction-coefficient-determining unit 230 and tone converting units 231 and 232.

Sample pixels are first obtained from images a and b to determine tone correction coefficients (step S31).

Figure 22:
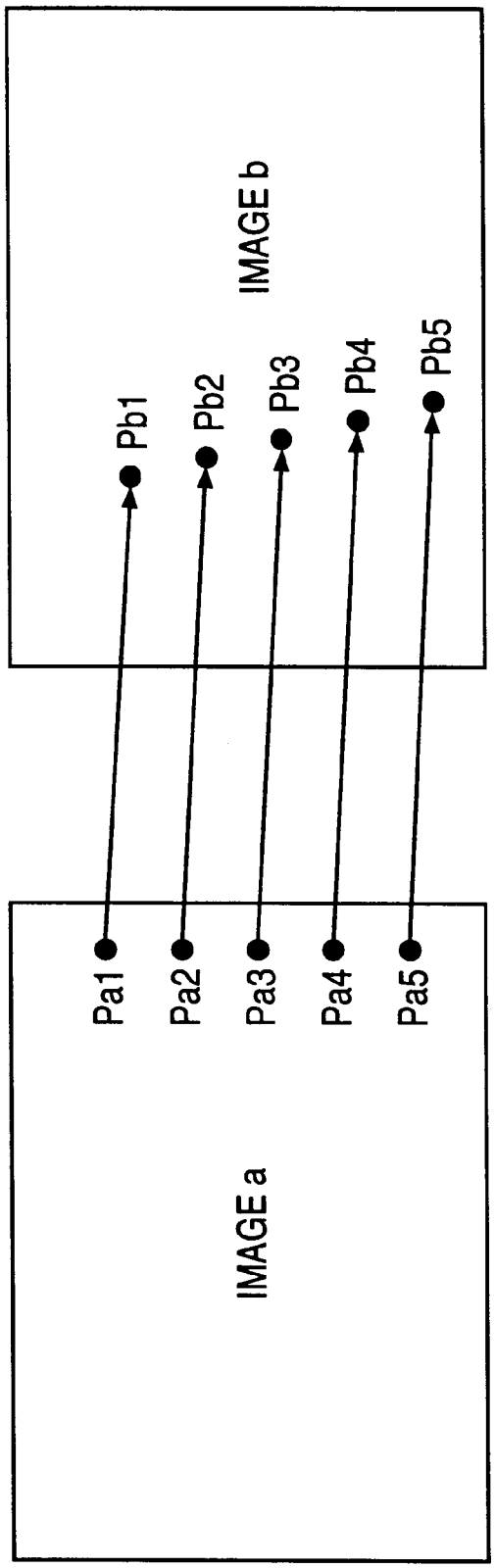
FIG. 22 is an explanatory view showing sample data obtained to determine tone correction coefficients.

FIG. 22 illustrates obtained sample pixels. The correction-coefficient-determining unit 230 first determines on the basis of the image combine parameters (A, B, C and D) estimated by the parameter estimating unit 240, as to whether or not a coordinates value of a sample pixel $P_{a1}$ of the image a is within the overlapping region. To make determination, the correction-coefficient-determining unit 230 converts the coordinates value of a sample pixel $P_{a1}$ of the image a into a coordinates value of image b by Affin transformation utilizing equation (3), and makes determination as to whether or not the converted coordinates value is included in the image b. If it is determined that the sample pixel $P_{a1}$ is in the overlapping region of the images a and b, a coordinates value corresponding to the sample pixel $P_{a1}$ in the image b is set to be a sample pixel $P_{b1}$. The correction-coefficient-determining unit 230 performs the same process on a plurality of sample pixels $P_{a1}$ to $P_{ak}$ (k =1 to N) of the input image a, and the obtained pixel values will be set as sample pixels $P_{b1}$ to $P_{bk}$ (k=1 to N).

Note that, as similar to the first embodiment, the correction-coefficient-determining unit 230 may perform the sampling of pixel values pixel by pixel, or for every arbitrary number of pixels. Moreover, the correction-coefficient-determining unit 230 may utilize, as sample data, an average value of neighboring pixel values based on the coordinates of the corresponding points obtained by utilizing the image combine parameters.

Referring back to FIG. 21, the correction-coefficient-determining unit 230 obtains tone correction coefficients of the image a on the basis of sample pixels $P_{ak}$ and $P_{bk}$ obtained in the foregoing manner (step S32). The tone correction coefficients are calculated as a coefficient of a tone correction function $f_a$.

Figure 23A:
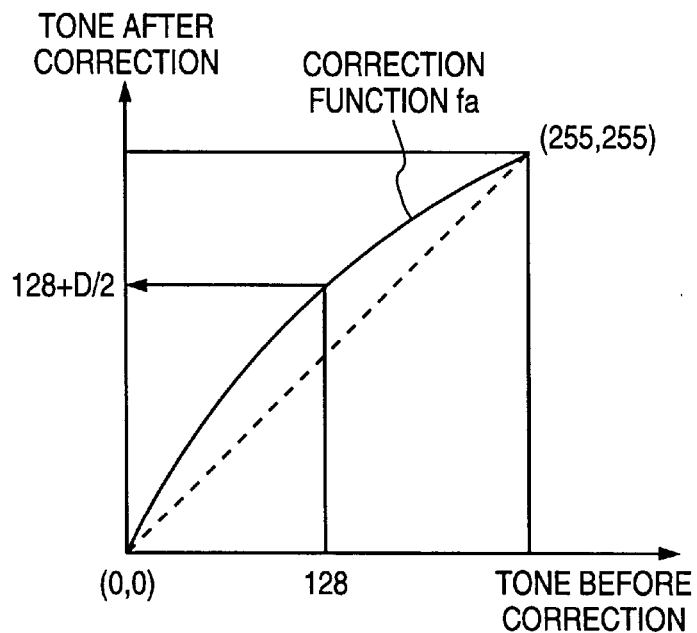
FIGS. 23A and 23B are graphs explaining the technique of tone correction according to the second embodiment.

The method of performing tone correction according to the second embodiment will be described with reference to FIG. 23A. In FIG. 23A, the abscissa indicates tones of an image before correction, and the ordinate indicates tones after correction.

First, average values Avg($P_a$) and Avg($P_b$) of the sample pixels $P_{ak}$ and $P_{bk}$ of the images a and b are calculated, and difference D of each average value is calculated by the following equation:

$$D=\text{Avg}(P_a)-\text{Avg}(P_b) \quad (16)$$

Then, as shown in FIG. 23A, a correction function $f_a$ is determined so that the tones of the image a can be expressed by a quadratic function (tone correction function) passing through three points: (0, 0), (255, 255) and (128, 128+D/2). Herein, since an arbitrary quadratic function can be defined by three parameters, it is assumed that the tone correction function $f_a$ is defined to be $T_{a1}$, $T_{a2}$ and $T_{a3}$. In addition, a value obtained by converting the sample pixel $P_{ak}$ of the image a utilizing the tone correction function $f_a$, is defined to be $f_a(P_{ak})$.

Referring back to the flowchart in FIG. 21, upon calculating the coefficients ($T_{a1}$, $T_{a2}$ and $T_{a3}$) of the tone correction function $f_a$ of the image a, the correction-coefficient-determining unit 230 calculates coefficients ($T_{b1}$ $T_{b2}$ and $T_{b3}$) of the tone correction function $f_b$ of the image b (step S33).

Figure 23B:
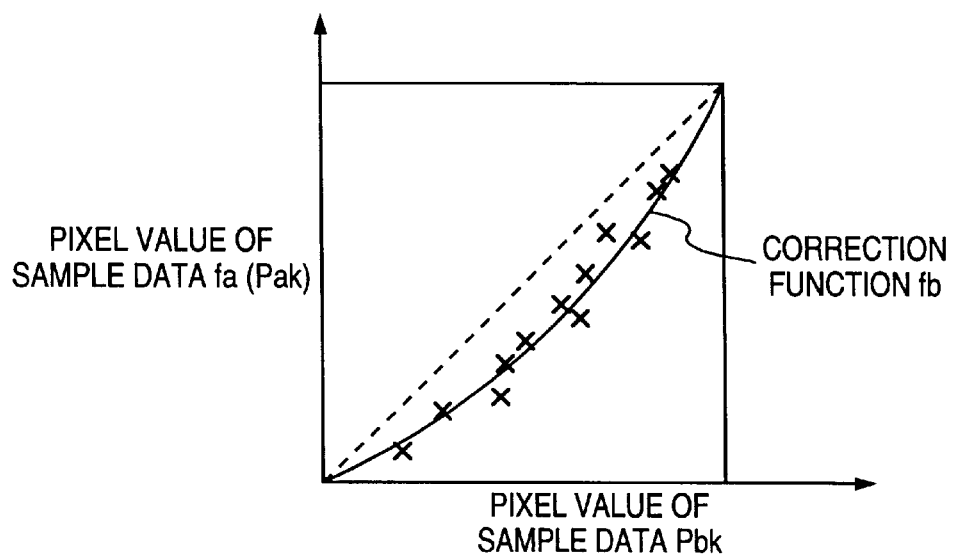

The tone correction function $f_b$ is obtained to be utilized as a function to coincide the sample pixel $P_{bk}$ with sample pixel $f_a(P_{ak})$. The coefficients ($T_{b1}$, $T_{b2}$ and $T_{b3}$) of the tone correction function $f_b$ are calculated by the least squares method, utilizing the sample pixels shown in FIG. 23B, to minimize $\epsilon$ in equation (17).

$$\epsilon=\{f_a(P_{ak})-(T_{b1}\times p_{bk}^2+T_{b2}\times p_{bk}+T_{b3})\}^2 \quad (17)$$

In accordance with the foregoing processing, tone correction functions $f_a$ and $f_b$ for converting tones of the images a and b are obtained by the following equation (18):

$$f_a(i)=T_{a1}\cdot i^2+T_{a2}\cdot i+T_{a3}$$

$$f_b(i)=T_{b1}\cdot i^2+T_{b2}\cdot i+T_{b3} \quad (18)$$

where i denotes tones before conversion. The correction-coefficient-determining unit 230 sends the calculated tone correction coefficients $T_a$ and $T_b$ respectively to the tone converting units 231 and 232.

Referring back to the flowcharts in FIG. 21, the tone converting units 231 and 232 respectively convert each of the pixel values of images a and b utilizing each of the tone correction coefficients sent by the correction-coefficient-determining unit 230 (step S34).

The operation of the tone converting unit 232 is described below. Note that the tone converting unit 231 executes the same operation as that of the tone converting unit 232.

Figure 24:
FIG. 24 shows a table utilized for converting pixel values in the image b to pixel values in the image a, according to the second embodiment.

In the tone converting unit 232, a table is generated to convert tones of the image b on the basis of tone correction coefficients $T_{b1}$, $T_{b2}$ and $T_{b3}$. More specifically, assuming that the dynamic range of the image is 8 bits, a table as shown in FIG. 24 is generated to convert a pixel value (0 to 255) of the image b into a pixel value $f_b(0)$~$f_b(255)$ according to the quadratic function in equation (18).

Note that in a case of a color image, the tone converting unit may perform tone conversion for each of the colors R, G and B. Alternatively, the tone converting unit may perform tone conversion by generating a conversion function commonly used for the colors R, G and B in accordance with a luminance signal. In this regard, the function $f_a$ which corrects tonality of the image a may be generated on the basis of pixel values of G image signals. All the R, G and B components of the image a may be converted by the function $f_a$. Conversion functions $f_b$ for R, G, B colors of the image b are generated in such a manner that pixel values of each color component of the converted image b by $f_b$ may match with those of the image a converted by using the function $f_a$.

Furthermore, although the quadratic function is utilized in the above description, another form of function may be utilized. It is also apparent that tone conversion may be performed by utilizing a non-linear table.

Combining Images

The tone converting units 231 and 232 sends the images a and b, on which tone conversion has been performed, to the image combining unit 250 where the images are combined into a single image. Since the process of combining images is identical to that of the first embodiment (FIG. 11), detailed description thereof will be omitted.

As has been described above, according to the image combining apparatus of the second embodiment, erroneously detected corresponding points are first determined in an overlapping region of images a and b partially having the same subject. Then, on the basis of a result of extracted corresponding points from which the erroneously detected corresponding points are removed, parameters (A, B, C and D) for combining the images are determined. Next, sample pixels ($P_{ak}$ and $P_{bk}$) used for tone correction are generated, utilizing the image combine parameters, and a tone correction coefficient ($T_a$) of the image a is calculated on the basis of an average value of the sample pixels. On the basis of the sample pixels of the image a on which tone correction has been performed utilizing the tone correction coefficient, a tone correction coefficient ($T_b$) of the image b is calculated. Since the images a and b are combined after tone correction is performed on the images a and b utilizing each of the tone correction coefficients calculated in the foregoing manner, it is possible to generate a combined image whose boundary of the images is inconspicuous, even in a case where the two images have different exposure conditions.

Furthermore, on account of the tone conversion of the image a performed on the basis of an average level of the pixel values in the overlapping region of the images, which is obtained in accordance with the above described image parameters, and also on account of the correction performed to coincide the tones of the image b with the corrected tones of the image a, the corrected tones of the images a and b are natural.

<Modification of Second Embodiment>

. . . Third Modified Embodiment

Next, a modification of the second embodiment (third modified embodiment) will be described with reference to FIGS. 25A to 26B.

An image combining apparatus according to the third modified embodiment has the same arrangement as that of the second embodiment shown in FIG. 19. However, functions and operation of the corresponding-point-extracting unit 220, corresponding-point-selecting unit 225 and correction-coefficient-determining unit 230 are different from those of the second embodiment. Hereinafter, description thereof will be provided.

Unlike the corresponding-point-extracting unit of the second embodiment, the corresponding-point-extracting unit 220 of the image combining apparatus 210 according to the third modified embodiment does not determine (step S4 in FIG. 5) reliability of corresponding points obtained by matching operation. Instead, the third modified embodiment recognizes a position having a minimum value of non-coincidence as a corresponding point.

The corresponding-point-selecting unit 225 repeats the process of removing erroneous corresponding points which is shown in the aforementioned equation (15), thereby enhancing accuracy in extracting corresponding points.

Figure 25A:
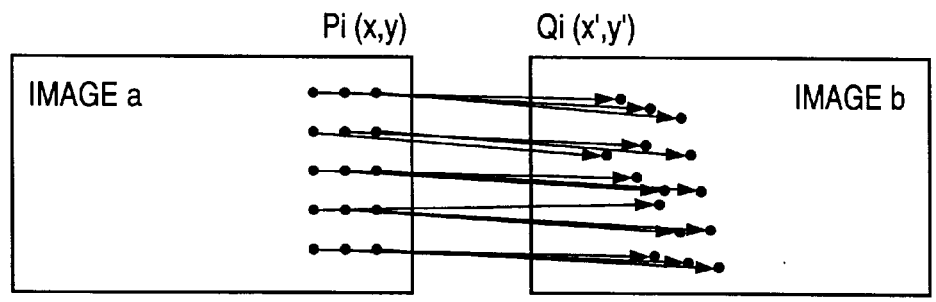
FIGS. 25A–25C are explanatory views explaining the steps of removing erroneous corresponding components by a corresponding-point-selecting unit, according to the third embodiment.
Figure 25B:
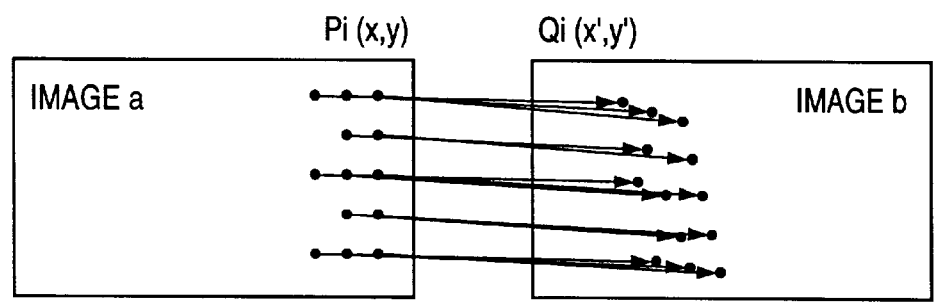
Figure 25C:
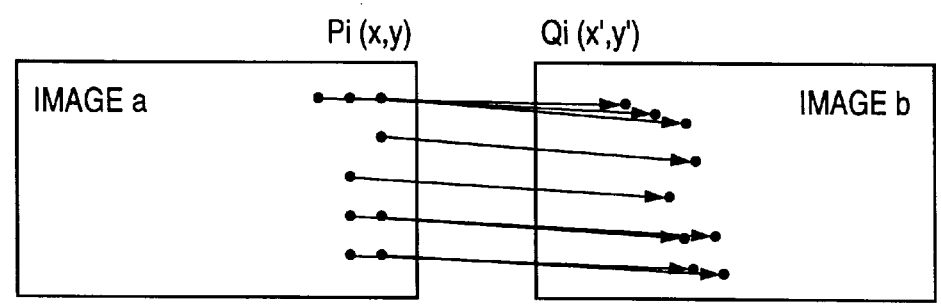

FIGS. 25A–25C are explanatory views for explaining the steps of removing erroneous corresponding points performed by the corresponding-point-selecting unit 225.

In accordance with a result of extraction (FIG. 25A) obtained by the corresponding-point-extracting unit 220, the parameter estimating unit calculates image conversion parameters A, B, C and D. The difference of each pair of corresponding points is then obtained in accordance with equation (15). Next, average values Avg(dx) and Avg(dy) of the differences are calculated. In the third modified embodiment, the average value of the differences is used as a threshold value. More specifically, the corresponding-point-selecting unit 225 removes erroneously recognized corresponding points as shown in FIG. 25B utilizing the values $Th_x \equiv Avg(dx)$ and $Th_y \equiv Avg(dy)$.

The corresponding-point-selecting unit 225 repeats the above processing until the average values Avg(dx) and Avg(dy) of the differences are converged to a predetermined value. The resultant corresponding points (FIG. 25C) are sent to the parameter estimating unit 240 where image combine parameters are estimated.

As similar to the second embodiment, the correction-coefficient-determining unit 230 obtains tone correction coefficients $T_a$ and $T_b$ on the basis of the sample pixels $P_{ak}$ and $P_{bk}$ obtained in the steps S32 and S33 in the flowchart in FIG. 21.

Figure 26A:
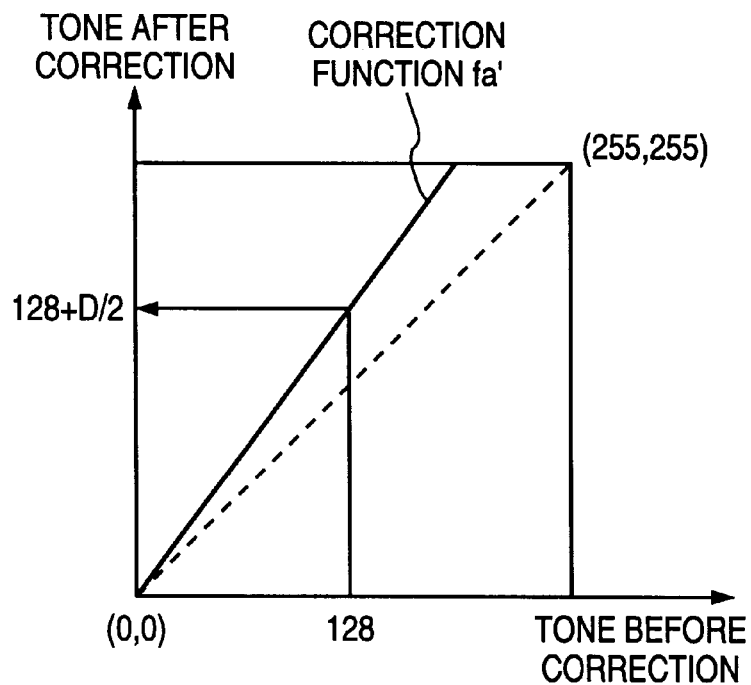
FIGS. 26A and 26B are graphs for explaining the steps of determining tone correction coefficients by a correction-coefficient-determining unit according to a third embodiment.
Figure 26B:
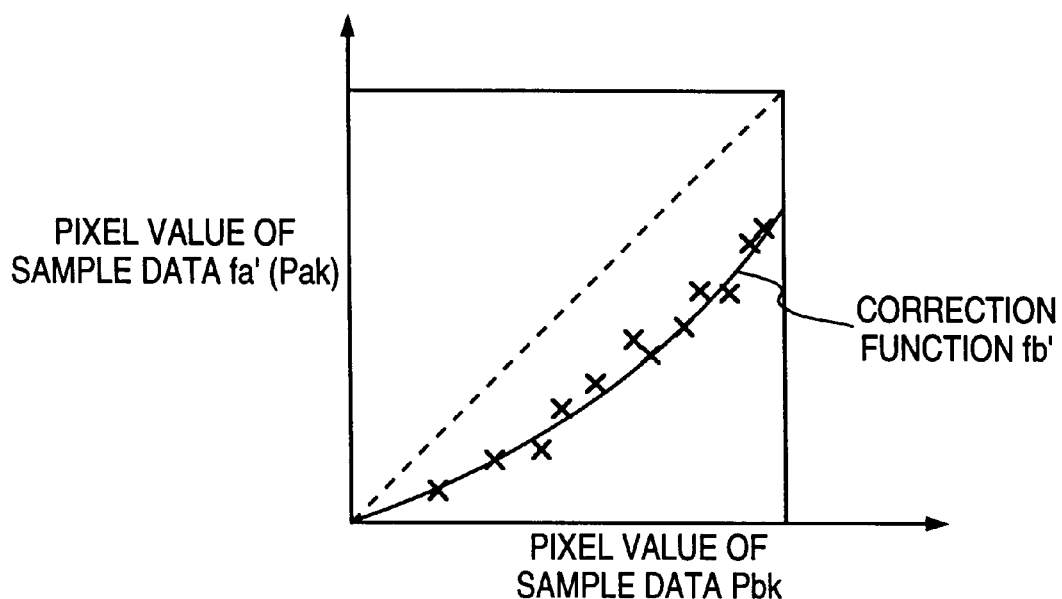

FIGS. 26A and 26B are graphs for explaining the steps of determining tone correction coefficients by the correction-coefficient-determining unit 230.

More specifically, the correction-coefficient-determining unit 230 calculates the average values $Avg(P_a)$ and $Avg(P_b)$ of the sample pixels $P_{ak}$ and $P_{bk}$ obtained from each of the images a and b, and further calculates difference D of each of the average values. As shown in FIG. 26A, tones of the image a are converted such that the tones are expressed by the linear function $f_a'$ passing through the points (0, 0) and (128, 128+D/2). The sample pixel $P_{ak}$ of the image a is converted in accordance with the tone correction function $f_a'$, and the converted sample pixel is defined to be $f_a'(P_{ak})$. Note that the coefficients of the tone correction function $f_a'$ are $T_{a1}'$ and $T_{a2}'$.

Furthermore, tone correction coefficient $f_b'$ is generated to coincide the sample pixel $P_{bk}$ with the sample pixel $f_a'(P_{ak})$. The abscissa in FIG. 26B indicates tones before correction, and the ordinate indicates tones corrected by utilizing the tone correction coefficient $f_b'$.

The coefficients $T_{b1}$, $T_{b2}$ and $T_{b3}$ utilized to generate the tone correction function $f_b'$ are calculated by the least squares method utilizing the sample pixels shown in FIG. 26B, to minimize $\epsilon$ in equation (17).

In accordance with the foregoing processing, tone correction function $f_a'$ and $f_b'$ for converting tones of the images a and b are obtained by the following equation (19):

$$f_a'(i) = T_{a1}' \cdot i + T_{a2}'$$
$$f_b'(i) = T_{b1}' \cdot i^2 + T_{b2}' \cdot i + T_{b3}' \qquad (19)$$

where i denotes tones before conversion.

As set forth above, according to the third modified embodiment, the corresponding-point-extracting unit does not determine the reliability of the corresponding points obtained by matching processing. Instead, a position having a minimum value of non-coincidence is recognized as a corresponding point. By virtue of this processing, it is possible to improve accuracy in extracting corresponding points. In addition, image combine parameters are set in accordance with the corresponding points having high precision from which erroneous corresponding points are removed. Further, the sample pixels for tone correction are generated by utilizing the image combine parameters. Therefore, it is possible to generate a combined image whose boundary of the images is inconspicuous, even in a case where the two images have different exposure conditions.

<Modification of Second Embodiment>

. . . Fourth Modified Embodiment

The fourth modified embodiment will be described next with reference to FIG. 27.

The arrangement of the image combining apparatus according to the fourth modified embodiment is identical to that of the second embodiment shown in FIG. 19. However, the operation of the correction-coefficient-determining unit 230 is different from that of the second embodiment. Hereinafter the operation thereof will be described.

In the foregoing second embodiment and the third modified embodiment, the correction-coefficient-determining unit obtains the sample pixels $P_{ak}$ and $P_{bk}$ shown in FIG. 22 which are utilized to generate tone correction coefficients, from pixel values of corresponding points between the images a and b, which are obtained on the basis of Affin transformation parameters (A, B, C and D). In the fourth modified embodiment, matching processing is performed in the neighbor of coordinates of the corresponding points which are obtained on the basis of Affin transformation parameters, so that sample pixels are obtained with high precision.

The operation of obtaining sample pixels according to the fourth modified embodiment will be described with reference to FIG. 27.

Figure 27:
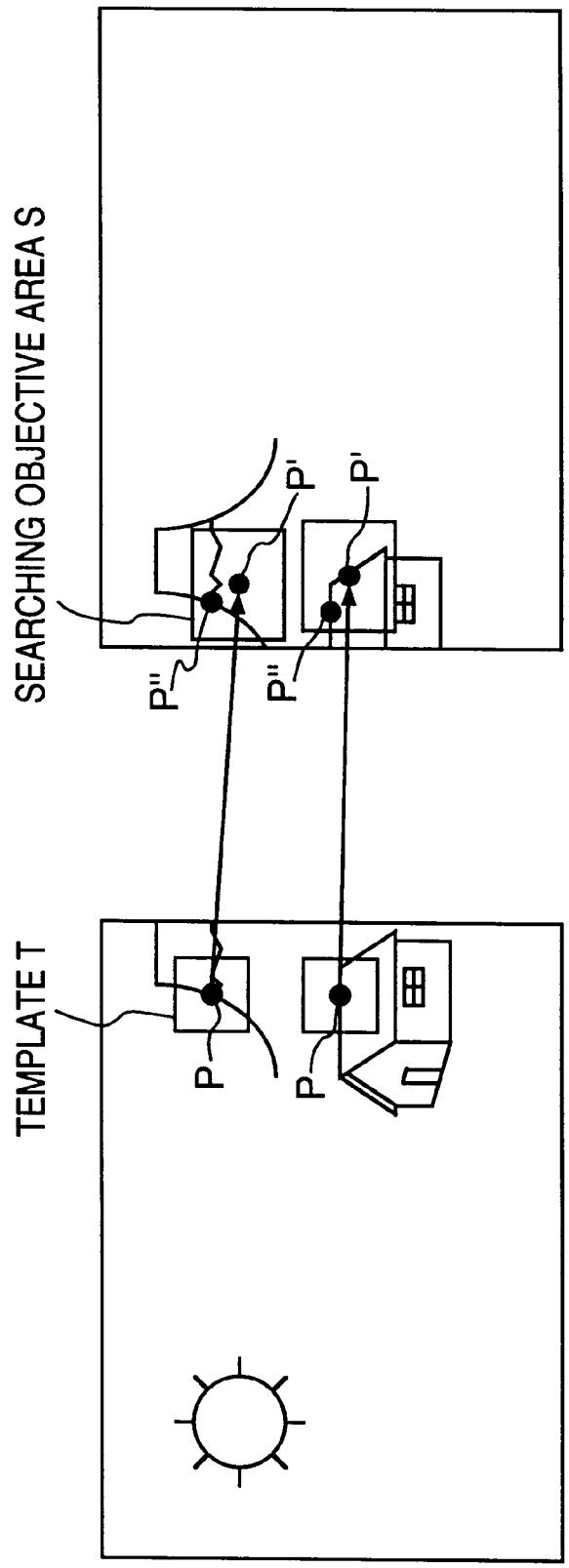
FIG. 27 is an explanatory view of obtaining sample data in the fourth embodiment.

In FIG. 27, points P and P' are a pair of corresponding points obtained on the basis of Affin transformation parameters. Herein, the template T is generated with the point P as the center of the image a'. Matching operation is executed with respect to points in the template T, within the range of the searching objective area S of the image b' having a point P' as its center. The obtained corresponding point is defined as a point P" which precisely coincides with the point P. Accordingly, deviation of sample pixels conventionally generated due to errors in the parameters is corrected (an error generated between P'–P"), thus more accurate sample pixels are generated.

The result of the matching processing is determined to be correct if a value of non-coincidence at a peak value is lower than a threshold value.

Suppose that a matched position cannot be found in the searching objective area S, sample pixels may be generated by utilizing coordinates of a corresponding point which is obtained by Affin transformation.

The tone correction process of the images a' and b', generation process of a combined image c' performed by the image combining unit 250 are performed similar to that of the second embodiment.

As set forth above, according to the fourth modified embodiment, highly accurate sample pixels can be obtained by performing matching processing in the neighbor of the coordinates of the corresponding points obtained on the basis of Affin transformation parameters.

The present invention is not limited to the above embodiments and various changes and modifications can be made within the spirit and scope of the present invention. Therefore, to appraise the public of the scope of the present invention, the following claims are made.

What is claimed is:

1. An image combining apparatus for combining a first image and a second image having an overlapping region which overlaps with the first image, comprising:

identifying means for discriminating the overlapping region within the first and second images, and identifying a first partial image corresponding to the overlapping region of the first image and a second partial image corresponding to the overlapping region of the second image;

detecting means for detecting corresponding pixels between the first partial image and the second partial image, and detecting tone densities of the first and second partial images on the basis of detected corresponding pixels;

tone correction means for performing tone correction on at least one of the corresponding pixels of the first partial image and those of the second partial image on the basis of a difference in tone density of the first partial image and the second partial image so that the tone density of the at least one partial image approximates to the other; and combining means for combining the first image and the second image, substituting image data in the overlapping region with image data indicative of the corrected first partial image and the second partial image.

2. The image combining apparatus according to claim 1, wherein said detecting means comprises calculating means for calculating a correction function which prescribes a correlation between the tone density of the first partial image and the tone density of the second partial image, and said tone correction means performs tone correction on either the first image or the second image utilizing the calculated correction function.

3. The image combining apparatus according to claim 2, wherein the correlation is approximated by a quadratic function.

4. The image combining apparatus according to claim 1, wherein said combining means adds weights to at least one of the first and second images corrected by said tone correction means, adds the weighted image to the original image, and combines the added image with the other image.

5. The image combining apparatus according to claim 1, further comprising:

setting means for setting a boundary at a substantial center of the overlapping region, wherein said combining means performs correction on pixels of the second partial image in correspondence with a distance from the boundary to the pixel.

6. The image combining apparatus according to claim 1, wherein said combining means sets a tone conversion area in the overlapping region.

7. The image combining apparatus according to claim 5, wherein said combining means performs tone conversion only on the second partial image.

8. The image combining apparatus according to claim 5, wherein said combining means performs tone conversion on the first partial image and the second partial image.

9. The image combining apparatus according to claim 5, wherein said combining means changes a size of the tone conversion area in accordance with a difference in density of the first partial image and density of the second partial image.

10. The image combining apparatus according to claim 5, wherein said combining means sets the tone conversion area in accordance with a difference in each average value of the first image and the second image within the overlapping region.

11. The image combining apparatus according to claim 1, wherein said identifying means determines mapping of coordinates conversion from a space of the first partial image to a space of the second partial image, and said combining means utilizes inverse transformation of said mapping to map the second partial image into the space of the first partial image, thereby combining the first image and the second image.

12. An image combine method of combining a first image and a second image having an overlapping region which overlaps with the first image, comprising the steps of:

discriminating the overlapping region within the first and second images to identify a first partial image corresponding to the overlapping region of the first image and a second partial image corresponding to the overlapping region of the second image;

detecting means for detecting corresponding pixels between the first partial image and the second partial image, and detecting tone densities of the first and second partial images on the basis of detected corresponding pixels;

performing tone correction on at least one of the corresponding pixels of the first partial image and those of the second partial image on the basis of a difference in tone density of the first partial image and the second partial image so that the tone density of the at least one partial image approximates to the other; and combining the first image and the second image, with substitution of image data in the overlapping region with image data indicative of the corrected first partial image and the second partial image.

13. The apparatus according to claim 1, wherein said identifying means comprises:

corresponding-point-extracting means for extracting a set of corresponding points from the first image and the second image; and removing means for removing from the set of corresponding points, data indicative of corresponding points which are erroneously detected as corresponding points by said corresponding-point-extracting means, on the basis of coordinates conversion parameters estimated by utilizing the set of corresponding points extracted by said corresponding-point-extracting means, wherein said combining means estimates image combine parameters on the basis of the set of corresponding points from which erroneous corresponding points have been removed.

14. The image combining apparatus according to claim 13, wherein said tone correction means extracts pixel values of the set of corresponding points, from which the erroneous corresponding points have been removed, respectively from the first image and the second image on the basis of the estimated image combine parameters, and performs tone correction respectively on the first and second images utilizing the extracted pixel values.

15. The image combining apparatus according to claim 13, wherein said tone correction means generates a first correction function for performing tone correction on the first image on the basis of a difference between an average value of the pixel values extracted from the first image and an average value of the pixel values extracted from the second image, performs tone correction on the first image utilizing the fist correction function, generates a second correction function to coincide the pixel values of the corresponding points in the second image from which the erroneous corresponding points have been removed by said removing means, with the pixel values of the corresponding points in the corrected first image from which the erroneous corresponding points have been removed, and performs tone correction on the second image utilizing the second correction function.

16. The image combine method according to claim 12, wherein said identifying step comprises the steps of:

extracting a set of corresponding points from the first image and the second image; and removing, from the set of corresponding points, data indicative of corresponding points which are erroneously detected as corresponding points in said extracting step, on the basis of coordinates conversion parameters estimated by utilizing the set of corresponding points extracted in said extracting step, wherein in said combining step, image combine parameters are estimated on the basis of the set of corresponding points from which erroneous corresponding points have been removed.

17. The image combine method according to claim 16, wherein said step of performing tone correction comprises the steps of:

extracting pixel values of the set of corresponding points, from which the erroneous corresponding points have been removed, respectively from the first image and the second image on the basis of the estimated image combine parameters; and performing tone correction respectively on the first and second images utilizing the extracted pixel values.

18. The image combine method according to claim 16, wherein said step of performing tone correction comprises the steps of:

generating a first correction function for performing tone correction on the first image on the basis of a difference between an average value of the pixel values extracted from the first image and an average value of the pixel values extracted from the second image;

performing tone correction on the first image utilizing the fist correction function, generating a second correction function to coincide the pixel values of the corresponding points in the second image from which the erroneous corresponding points have been removed in said removing step, with the pixel values of the corresponding points in the corrected first image from which the erroneous corresponding points have been removed, and performing tone correction on the second image utilizing the second correction function.

* * * * *

UNITED STATES PATENT AND TRADEMARK OFFICE
CERTIFICATE OF CORRECTION

PATENT NO. : 5,982,951
DATED : November 9, 1999
INVENTOR(S) : Katayama et al.

It is certified that error appears in the above-identified patent and that said Letters Patent is hereby corrected as shown below:

Column 5:
Line 38, delete "Si" and insert therefore -- S1 --.

Column 17:
Line 63, delete "$T_{b1}\ T_{b2}$" and insert therefor -- $T_{b1}, T_{b2}$ --.

Signed and Sealed this

Nineteenth Day of June, 2001

Attest:

NICHOLAS P. GODICI
Attesting Officer   Acting Director of the United States Patent and Trademark Office